US010694115B2

(12) United States Patent
Li

(10) Patent No.: US 10,694,115 B2
(45) Date of Patent: Jun. 23, 2020

(54) METHOD, APPARATUS, AND TERMINAL FOR PRESENTING PANORAMIC VISUAL CONTENT

(71) Applicant: HUAWEI TECHNOLOGIES CO., LTD., Shenzhen (CN)

(72) Inventor: Zijun Li, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 15/764,882

(22) PCT Filed: Sep. 30, 2015

(86) PCT No.: PCT/CN2015/091259
§ 371 (c)(1),
(2) Date: Mar. 30, 2018

(87) PCT Pub. No.: WO2017/054185
PCT Pub. Date: Apr. 6, 2017

(65) Prior Publication Data
US 2018/0278855 A1 Sep. 27, 2018

(51) Int. Cl.
H04N 5/232 (2006.01)
H04N 13/30 (2018.01)
(Continued)

(52) U.S. Cl.
CPC .......... H04N 5/2628 (2013.01); G06F 3/011 (2013.01); G06F 3/012 (2013.01); G06T 7/11 (2017.01);
(Continued)

(58) Field of Classification Search
CPC .............. G06F 3/012; H04N 21/44218; H04N 21/21805; H04N 13/366; H04N 13/368; G06K 9/00362
See application file for complete search history.

(56) References Cited

U.S. PATENT DOCUMENTS 6,084,594 A 7/2000 Goto
2005/0280706 A1* 12/2005 Jong ................. G09F 19/22
348/143
(Continued)

FOREIGN PATENT DOCUMENTS

CN 102497563 A 6/2012
CN 103186233 A 7/2013
(Continued)

OTHER PUBLICATIONS

XP058043111 Constantin Schmidt et al., "Screenfinity: Extending the Perception Area of Content on Very Large Public Displays", CHI 2013: Changing Perspectives, Paris, France, total 10 pages.

Primary Examiner — Alison Slater
(74) Attorney, Agent, or Firm — Kilpatrick Townsend & Stockton LLP

(57) ABSTRACT

The embodiments provide a method, an apparatus, and a terminal for presenting panoramic visual content. The method includes: obtaining viewer information of a viewing region of a panoramic visual content presentation device; determining a target viewer according to the viewer information; and outputting, according to a change in a position of the target viewer relative to the panoramic visual content presentation device, panoramic visual content in a photographing order of the panoramic visual content or in an order reverse to the photographing order. In the present invention, the panoramic visual content is output according to a requirement of the target viewer, on the panoramic content presentation device that cannot be directly touched during viewing, thereby bringing a satisfactory presentation effect and good user experience.

14 Claims, 10 Drawing Sheets

(51) Int. Cl.
*H04N 5/262* (2006.01)
*G06F 3/01* (2006.01)
*G06T 7/11* (2017.01)
*H04N 21/442* (2011.01)

(52) U.S. Cl.
CPC ... *H04N 5/23238* (2013.01); *H04N 21/44218* (2013.01)

(56) References Cited

U.S. PATENT DOCUMENTS

| | | | |
|---|---|---|---|
| 2010/0080464 A1 | 4/2010 | Sawai et al. | |
| 2010/0156907 A1 | 6/2010 | Vanderspek et al. | |
| 2012/0060177 A1 | 3/2012 | Stinson, III et al. | |
| 2013/0057546 A1* | 3/2013 | Watanabe | G06T 3/4038 345/419 |
| 2013/0201099 A1* | 8/2013 | Guerin | G06F 3/005 345/156 |
| 2014/0009503 A1 | 1/2014 | Gorstan et al. | |
| 2015/0070475 A1* | 3/2015 | Kim | G02B 27/2278 348/51 |
| 2015/0097923 A1 | 4/2015 | Kim et al. | |
| 2015/0153940 A1 | 6/2015 | Chien et al. | |
| 2015/0253845 A1* | 9/2015 | Kempinski | G06F 3/013 345/156 |
| 2016/0012855 A1* | 1/2016 | Krishnan | G11B 27/105 386/241 |
| 2016/0065856 A1* | 3/2016 | Sohn | H04N 5/23258 348/333.11 |
| 2016/0246061 A1* | 8/2016 | Bickerstaff | G06F 3/012 |

FOREIGN PATENT DOCUMENTS

| | | |
|---|---|---|
| CN | 104519291 A | 4/2015 |
| CN | 102740154 B | 7/2015 |
| CN | 104866809 A | 8/2015 |
| CN | 102695011 B | 2/2016 |
| JP | 4251673 B2 | 4/2009 |

* cited by examiner

METHOD, APPARATUS, AND TERMINAL FOR PRESENTING PANORAMIC VISUAL CONTENT

CROSS-REFERENCE TO RELATED APPLICATIONS

This application is a national stage of International Application No. PCT/CN2015/091259, filed on Sep. 30, 2015, which is hereby incorporated by reference in its entirety.

TECHNICAL FIELD

The present invention relates to the field of image processing technologies, and in particular, to a method, an apparatus, and a terminal for presenting panoramic visual content.

BACKGROUND

Panoramic visual content refers to visual content that is photographed in a photographing process correspondingly according to a position change process in which a position of a photographing device relative to a photographed object is changed (for example, a photographing angle or a photographing distance is changed). The visual content is content visually sensed by a human body, for example, an image or a video.

When panoramic visual content (such as panoramic visual content photographed by changing a photographing angle) is presented by using a mobile terminal, the mobile terminal plays images according to a sliding track (for example, slide to the left or slide to the right) of a finger of a user on a touchscreen or a posture change (for example, tilt to the left or tilt to the right) of the mobile terminal, and in a splicing order of the images or in an order reverse to the splicing order (if the finger of the user slides to the left, the images are played in the splicing order of the images; if the finger of the user slides to the right, the images are played in the order reverse to the splicing order of the images), so that a viewer can view visual content obtained after a photographing position for a photographed object changes continuously. If the photographed object takes an action in a photographing process, the viewer further views a process in which the action changes continuously.

During implementation of the present invention, the inventor finds that the prior art has at least the following problem.

Currently, panoramic visual content can be presented only on a touchable device such as a mobile terminal. For a device that cannot be directly touched usually during viewing, for example, a large display in a public place, a viewer cannot directly perform an operation (such as sliding or changing a posture) on the device. As a result, this type of device cannot present panoramic visual content according to a requirement of the viewer, leading to an unsatisfactory presentation effect and poor user experience.

SUMMARY

To resolve a problem that in the prior art, some devices cannot present panoramic visual content according to a requirement of a viewer, leading to an unsatisfactory presentation effect and poor user experience, embodiments of the present invention provide a method, an apparatus, and a terminal for presenting panoramic visual content. The technical solutions are as follows:

According to a first aspect, an embodiment of the present invention provides a method for presenting panoramic visual content, where the method includes:

obtaining viewer information of a viewing region of a panoramic visual content presentation device;

determining a target viewer according to the viewer information; and outputting, according to a change in a position of the target viewer relative to the panoramic visual content presentation device, panoramic visual content in a photographing order of the panoramic visual content or in an order reverse to the photographing order.

In a possible implementation of the first aspect, the obtaining viewer information of a viewing region of a panoramic visual content presentation device includes:

obtaining an image of the viewing region; and performing an image analysis on the image of the viewing region to obtain the viewer information, where the viewer information includes a human body identified from the image, a position of at least one human body in the image, and an orientation of a human face of at least one human body in the image.

Optionally, the obtaining an image of the viewing region includes:

detecting in real time whether there is a human body in the viewing region; and obtaining the image of the viewing region when a human body is detected in the viewing region.

In another possible implementation of the first aspect, the determining a target viewer according to the viewer information includes:

determining at least one viewer in the viewing region according to the viewer information; and determining one of the at least one viewer as the target viewer.

Optionally, when there are at least two determined viewers, the determining one of the at least one viewer as the target viewer includes at least one of the following determining manners:

determining the target viewer according to whether a human face of the viewer has faced toward the panoramic visual content presentation device;

determining the target viewer according to a viewing angle of the viewer; or determining the target viewer according to a distance between the viewer and the panoramic visual content presentation device.

In still another possible implementation of the first aspect, the method further includes:

determining, according to at least one of the following conditions, whether to replace the target viewer:

the viewing angle of the target viewer;

the distance between the target viewer and the panoramic visual content presentation device; or whether the target viewer is in the viewing region; and after the target viewer is replaced, outputting, according to a change in a position of a replacement target viewer relative to the panoramic visual content presentation device, the panoramic visual content in the photographing order or in the order reverse to the photographing order.

In yet another possible implementation of the first aspect, the outputting, according to a change in a position of the target viewer relative to the panoramic visual content presentation device, panoramic visual content in a photographing order of the panoramic visual content or in an order reverse to the photographing order includes:

determining the viewing angle of the target viewer in real time; and outputting segments whose photographing angles correspond to viewing angles of the target viewer, where the multiple consecutive segments form the panoramic visual content.

In still yet another possible implementation of the first aspect, the outputting, according to a change in a position of the target viewer relative to the panoramic visual content presentation device, panoramic visual content in a photographing order of the panoramic visual content or in an order reverse to the photographing order includes:

determining a viewing distance of the target viewer in real time; and outputting segments whose photographing distances correspond to viewing distances of the target viewer, where the multiple consecutive segments form the panoramic visual content.

In a further possible implementation of the first aspect, the method further includes:

outputting a specified segment or outputting the panoramic visual content in a specified order when the target viewer cannot be determined, where the panorama includes multiple consecutive segments.

Optionally, the segment is an image or a video presented on the panoramic visual content presentation device.

According to a second aspect, an embodiment of the present invention provides an apparatus for presenting panoramic visual content, where the apparatus includes:

an obtaining module, configured to obtain viewer information of a viewing region of a panoramic visual content presentation device;

a determining module, configured to determine a target viewer according to the viewer information; and a first output module, configured to output, according to a change in a position of the target viewer relative to the panoramic visual content presentation device, panoramic visual content in a photographing order of the panoramic visual content or in an order reverse to the photographing order.

In a possible implementation of the second aspect, the obtaining module includes:

an obtaining unit, configured to obtain an image of the viewing region; and an identification unit, configured to perform human face image identification on the image of the viewing region to obtain the viewer information, where the viewer information includes a human body identified from the image, a position of at least one human body in the image, and an orientation of a human face of at least one human body in the image.

Optionally, the obtaining unit includes:

a detection subunit, configured to detect in real time whether there is a human body in the viewing region; and an obtaining subunit, configured to obtain the image of the viewing region when a human body is detected in the viewing region.

In another possible implementation of the second aspect, the determining module includes:

a viewer determining unit, configured to determine at least one viewer in the viewing region according to the viewer information; and a target viewer determining unit, configured to determine one of the at least one viewer as the target viewer.

Optionally, the target viewer determining unit is configured to:

determine one of the viewers as the target viewer according to at least one of the following determining manners when there are at least two determined viewers:

determining the target viewer according to whether a human face of the viewer has faced toward the panoramic visual content presentation device;

determining the target viewer according to a viewing angle of the viewer; or determining the target viewer according to a distance between the viewer and the panoramic visual content presentation device.

In still another possible implementation of the second aspect, the apparatus further includes:

a replacement module, configured to determine, according to at least one of the following conditions, whether to replace the target viewer:

the viewing angle of the target viewer;

the distance between the target viewer and the panoramic visual content presentation device; or whether the target viewer is in the viewing region; and the first output module is configured to: after the target viewer is replaced, output, according to a change in a position of a replacement target viewer relative to the panoramic visual content presentation device, the panoramic visual content in the photographing order or in the order reverse to the photographing order.

In yet another possible implementation of the second aspect, the first output module includes:

an angle determining unit, configured to determine the viewing angle of the target viewer in real time; and a first output unit, configured to output segments whose photographing angles correspond to viewing angles of the target viewer, where the multiple consecutive segments form the panoramic visual content.

In still yet another possible implementation of the second aspect, the first output module includes:

a distance determining unit, configured to view determine a viewing distance of the target viewer in real time; and a second output unit, configured to output segments whose photographing distances correspond to viewing distances of the target viewer, where the multiple consecutive segments form the panoramic visual content.

In a further possible implementation of the second aspect, the apparatus further includes:

a second output module, configured to output a specified segment or output the panoramic visual content in a specified order when the target viewer cannot be determined, where the panorama includes multiple consecutive segments.

Optionally, the segment is an image or a video presented on the panoramic visual content presentation device.

According to a third aspect, an embodiment of the present invention provides a terminal for presenting panoramic visual content, where the terminal includes:

a processor, configured to obtain viewer information of a viewing region of a panoramic visual content presentation device; and determine a target viewer according to the viewer information; and a display, configured to output, according to a change in a position of the target viewer relative to the panoramic visual content presentation device, panoramic visual content in a photographing order of the panoramic visual content or in an order reverse to the photographing order.

In a possible implementation of the third aspect, the terminal further includes:

a camera, configured to obtain an image of the viewing region; and the processor is configured to perform an image analysis on the image of the viewing region to obtain the viewer information, where the viewer information includes a human body identified from the image, a position of at least one human body in the image, and an orientation of a human face of at least one human body in the image.

Optionally, the terminal further includes:

a human body sensor, configured to detect in real time whether there is a human body in the viewing region; and the camera is configured to obtain the image of the viewing region when a human body is detected in the viewing region.

In another possible implementation of the third aspect, the processor is configured to:

determine at least one viewer in the viewing region according to the viewer information; and determine one of the at least one viewer as the target viewer.

Optionally, the processor is configured to:

determine one of the viewers as the target viewer according to at least one of the following determining manners when there are at least two determined viewers:

determining the target viewer according to whether a human face of the viewer has faced toward the panoramic visual content presentation device;

determining the target viewer according to a viewing angle of the viewer; or determining the target viewer according to a distance between the viewer and the panoramic visual content presentation device.

In still another possible implementation of the third aspect, the processor is further configured to:

determine, according to at least one of the following conditions, whether to replace the target viewer:

the viewing angle of the target viewer;

the distance between the target viewer and the panoramic visual content presentation device; or whether the target viewer is in the viewing region; and after the target viewer is replaced, output, according to a change in a position of a replacement target viewer relative to the panoramic visual content presentation device, the panoramic visual content in the photographing order or in the order reverse to the photographing order.

In yet another possible implementation of the third aspect, the processor is configured to determine the viewing angle of the target viewer in real time; and the display is configured to output segments whose photographing angles correspond to viewing angles of the target viewer, where the multiple consecutive segments form the panoramic visual content.

In still yet another possible implementation of the third aspect, the processor is configured to determine a viewing distance of the target viewer in real time; and the display is configured to output segments whose photographing distances correspond to viewing distances of the target viewer, where the multiple consecutive segments form the panoramic visual content.

In a further possible implementation of the third aspect, the display is further configured to:

output a specified segment or output the panoramic visual content in a specified order when the target viewer cannot be determined, where the panorama includes multiple consecutive segments.

Optionally, the segment is an image or a video presented on the panoramic visual content presentation device.

The technical solutions provided in the embodiments of the present invention have the following beneficial effects.

Viewer information of a viewing region of a panoramic visual content presentation device is obtained, a target viewer is determined according to the viewer information, and panoramic visual content is output in a photographing order of the panoramic visual content or in an order reverse to the photographing order and according to a change in a position of the target viewer relative to the panoramic visual content presentation device, so that the panoramic visual content is presented, according to the change in the position of the target viewer relative to the panoramic visual content presentation device and according to a requirement of the target viewer on the panoramic visual content display device that cannot be directly touched during viewing, thereby bringing a satisfactory presentation effect and good user experience.

BRIEF DESCRIPTION OF DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

To make the objectives, technical solutions, and advantages of the present invention clearer, the following further describes the embodiments of the present invention in detail with reference to the accompanying drawings.

Figure 1:
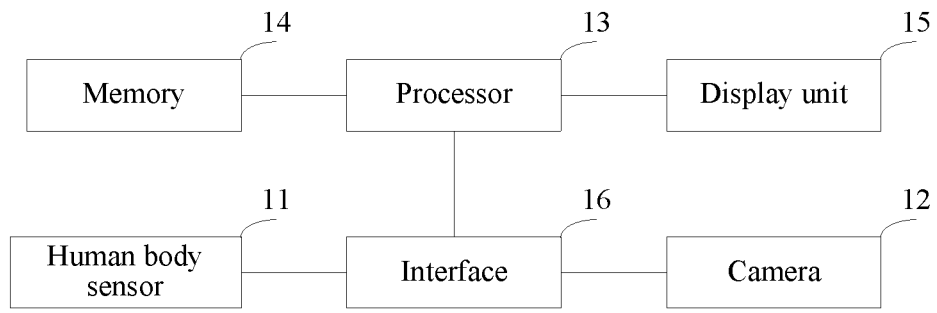
FIG. 1 is a schematic structural diagram of an apparatus for presenting panoramic visual content according to an embodiment of the present invention.

First, an apparatus for presenting panoramic visual content according to an embodiment of the present invention is briefly described in the following with reference to FIG. 1. The apparatus is a device that cannot be directly touched during viewing. For example, a shortest distance between the device and a viewing region of the device is greater than a distance between a human eye and a finger when an arm is straightened. As shown in FIG. 1, the apparatus includes a human body sensor 11, a camera 12, a processor 13, a memory 14, a display unit 15, and an interface 16.

The human body sensor 11 may be configured to detect whether there is a human body in the viewing region of the device. The human body sensor 11 is connected to the processor 13 by using the interface 16. The human body sensor 11 transmits, by using the interface 16, information about whether a human body is detected in the viewing region of the device to the processor 13, so that when the human body sensor 11 detects a human body in the viewing region of the device, the processor 13 controls the camera 12 to be enabled.

The camera 12 may be configured to obtain an image of the viewing region of the device. The camera 12 is also connected to the processor 13 by using the interface 16. The camera 12 transmits the obtained image of the viewing region of the device to the processor 13 by using the interface 16.

The memory 14 may be configured to store a software program and an application module. The processor 13 performs various functional applications and data processing by operating the software program and the application module stored in the memory 14. The memory 14 may mainly include a program storage area and a data storage area. The program storage area may store an operating system, an application program required by at least one function (such as an image recognition function and a panoramic visual content presentation function), and the like. The data storage area may store data (such as panoramic visual content and the image of the viewing region of the device) created according to usage of the device, or the like. In addition, the memory 14 may include a high-speed random access memory (Random Access Memory, RAM for short), or may include a non-volatile memory (non-volatile memory), for example, at least one magnetic disk storage (for example, a hard disk), a flash memory (for example, a secure digital SD card), or another volatile solid-state storage (for example, a memory). Correspondingly, the memory 14 may further include a memory controller, so that the processor 13 can access the memory 14.

The display unit 15 may be configured to display the panoramic visual content. The display unit 15 may include a display panel. Optionally, the display panel may be configured in a form of a liquid crystal display (Liquid Crystal Display, LCD for short), an organic light-emitting diode (Organic Light-Emitting Diode, OLED), a projector, or the like.

The interface 16 may be a wireless interface such as a Wireless Fidelity (Wireless Fidelity, WiFi for short) module or a Bluetooth module, or may be a wired interface such as a Universal Serial Bus (Universal Serial Bus, USB for short) interface.

The processor 13 is a control center of the device, connects to parts by using various interfaces and lines, and performs various functions and data processing by operating or executing the software program stored in the memory 14 and by calling the data stored in the memory 14, so as to monitor the entire device. Optionally, the processor 13 may include one or more of the following: one or more processing cores, a dedicated processor, an embedded processor, a controller, or an application-specific integrated circuit (Application Specific Integrated Circuit, ASIC for short). Preferably, the processor 13 may integrate an application processor and a modem processor. The application processor mainly processes the operating system, the application program, and the like. The modem processor mainly processes wireless communication. It may be understood that the foregoing modem processor may not be integrated into the processor 13.

It should be noted that the implementation apparatus shown in FIG. 1 is merely an example, and the present invention is not limited thereto.

Embodiment 1

Figure 2:
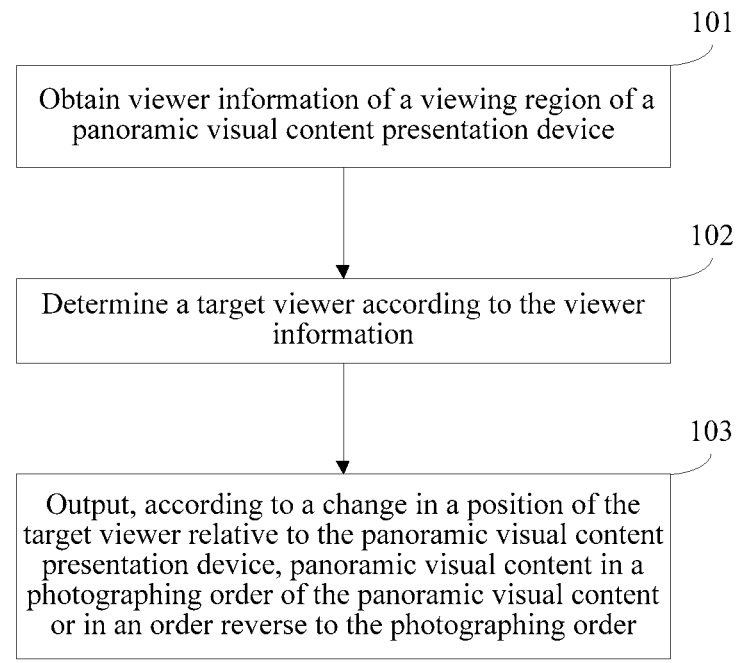
FIG. 2 is a flowchart of a method for presenting panoramic visual content according to Embodiment 1 of the present invention.

An embodiment of the present invention provides a method for presenting panoramic visual content. Referring to FIG. 2, the method includes the following steps.

Step 101: Obtain viewer information of a viewing region of a panoramic visual content presentation device.

In this embodiment, the panoramic visual content presentation device is a device that cannot be directly touched during viewing. During actual application, a panoramic visual content presentation device may be a display device ranging from tens to hundreds of inches, for example, a television of tens of inches at home or a display screen of hundreds of inches in a public place. In this case, a shortest distance between the viewing region and the panoramic visual content presentation device usually ranges from several meters to tens of meters, and a person cannot directly touch the panoramic visual content presentation device during viewing.

The viewing region of the panoramic visual content presentation device is a region that is in front of the panoramic visual content presentation device and whose distance to the panoramic visual content presentation device is in a range.

The viewer information may include a human body in the viewing region, a position of at least one human body, and an orientation of a human face of at least one human body.

Step 102: Determine a target viewer according to the viewer information.

In this embodiment, the target viewer may be one of viewers in the viewing region of the panoramic visual content presentation device. It is easy to know that as time goes by, the viewers change, and the target viewer also changes. For example, the target viewer is a person in a time period, and the target viewer is another person in another time period.

Step 103: Output, according to a change in a position of the target viewer relative to the panoramic visual content presentation device, panoramic visual content in a photographing order of the panoramic visual content or in an order reverse to the photographing order.

In this embodiment, panoramic visual content refers to visual content that is photographed in a photographing process correspondingly according to a position change process in which a position of a photographing device relative to a photographed object is changed (for example, a photographing angle or a photographing distance is changed). The visual content is content visually sensed by a human body, for example, an image or a video.

The photographing order of the panoramic visual content is a space change order of the photographing device relative to the photographed object, and records a status change process of the photographed object relative to the photographing device. In addition, space changes in a time order. For example, if a photographing device moves along positions A, B, C, and D relative to a photographed object, the photographing order of the panoramic visual content is to successively photograph visual content (an image or a video) on the positions A, B, C, and D. During actual application, the space may not change in a time order. For example, if four photographing devices are respectively fixed on positions A, B, C, and D relative to a photographed object, the photographing order of the panoramic visual content is to respectively photograph visual content (an image or a video) on the positions A, B, C, and D.

To output the panoramic visual content in the photographing order of the panoramic visual content is to reproduce visual content photographed in a change process of a photographing device relative to a photographed object. An order reverse to the photographing order of the panoramic visual content is to play, in a reverse manner, the status change process of the photographed object relative to the photographing device. To output the panoramic visual content in the order reverse to the photographing order of the panoramic visual content is to play, in a reverse manner, the visual content photographed in the change process of the photographing device relative to the photographed object. For example, if the photographed object moves from the top down during photographing, an effect obtained through playing in this case is that the photographed object moves from the bottom up.

Outputting the panoramic visual content according to a change in a position of the target viewer relative to the panoramic visual content presentation device may be, when the target viewer moves from one side to another side of the panoramic visual content presentation device, outputting the panoramic visual content in the photographing order of the panoramic visual content, and when the target viewer moves from the another side to the one side of the panoramic visual content presentation device, outputting the panoramic visual content in an order reverse to the photographing order of the panoramic visual content. Alternatively, when the target viewer moves toward the panoramic visual content presentation device, the panoramic visual content is output in the photographing order of the panoramic visual content, and when the target viewer is far away from the panoramic visual content presentation device, the panoramic visual content is output in the order reverse to the photographing order of the panoramic visual content.

In this embodiment of the present invention, viewer information of a viewing region of a panoramic visual content presentation device is obtained, a target viewer is determined according to the viewer information, and panoramic visual content is output in a photographing order of the panoramic visual content or in an order reverse to the photographing order and according to a change in a position of the target viewer relative to the panoramic visual content presentation device, so that the panoramic visual content is presented, according to the change in the position of the target viewer relative to the panoramic visual content presentation device and according to a requirement of the target viewer on the panoramic content presentation device that cannot be directly touched during viewing, thereby bringing a satisfactory presentation effect and good user experience.

Embodiment 2

An embodiment of the present invention provides a method for presenting panoramic visual content. In this embodiment, a change in a position of a target viewer relative to a panoramic visual content presentation device is a change in an angle of the target viewer relative to the panoramic visual content presentation device. Specifically, the angle of the target viewer relative to the panoramic visual content presentation device is a change in an angle between a connection line and a plane in which the panoramic visual content presentation device is located, where the connection line is between the target viewer and a center of the panoramic visual content presentation device.

Figure 3A:
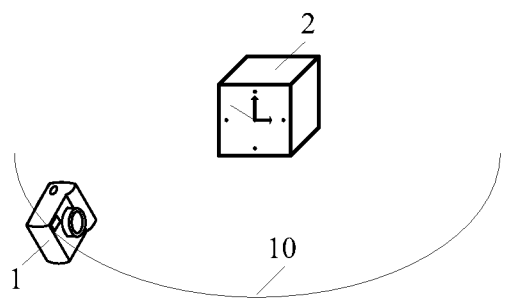
FIG. 3a to FIG. 3c are implementation scenario diagrams of a method for presenting panoramic visual content according to Embodiment 2 of the present invention.
Figure 3B:
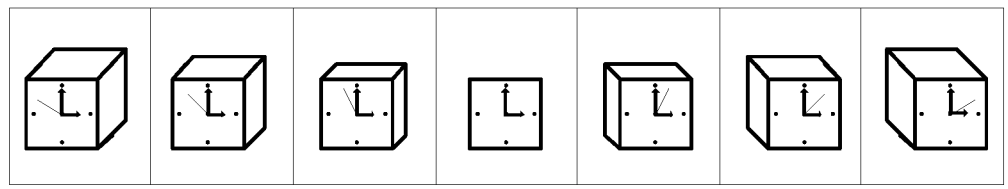
Figure 3C:
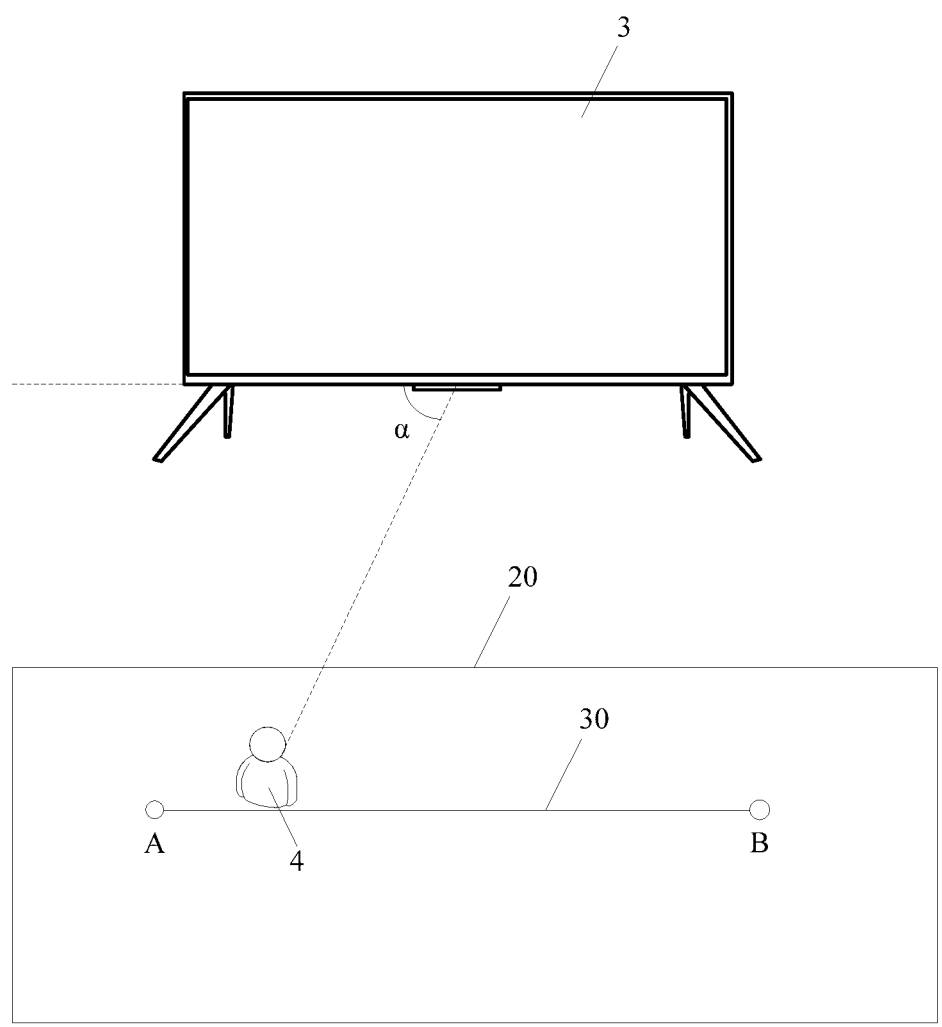

With reference to FIG. 3a to FIG. 3c, the following first describes by using an example, an implementation scenario of the method for presenting panoramic visual content provided in this embodiment.

FIG. 3a shows a photographing scenario of panoramic visual content. As shown in FIG. 3a, a photographing device 1 uses a photographed object 2 as a center to photograph the photographed object 2 by moving around the photographed object 2, that is, a photographing distance is fixed, while a photographing angle is continuously changed. Specifically, the photographing device 1 moves along an arc 10 shown in FIG. 3a, photographs the photographed object 2 in a movement process by keeping a lens directly facing toward the photographed object 2, and obtains the panoramic visual content. In the photographing process, the photographed object 2 may take an action. A hand of a clock (a photographed object) shown in FIG. 3a moves on a clock face. In this case, the action of the photographed object in the panoramic visual content continuously changes together with the photographing angle. A position of a second hand of the clock shown in FIG. 3b synchronously changes with the photographing angle.

FIG. 3c shows a display scenario of panoramic visual content and is applicable to presenting the panoramic visual content obtained in the photographing scenario shown in FIG. 3a. As shown in FIG. 3c, a panoramic visual content presentation device 3 presents panoramic visual content to a viewer 4. A rectangular region 20 is a viewing region (a shortest distance to the panoramic visual content presentation device 3 is greater than a distance between a human eye and a finger when an arm is straightened) of the panoramic visual content presentation device 3. The viewer 4 needs to view the panoramic visual content presented on the panoramic visual content presentation device 3 in the rectangular region 20. If being located outside the rectangular region 20, the viewer 4 may be incapable of viewing all content presented on the panoramic visual content presentation device 3 due to an excessively short distance to the panoramic visual content presentation device 3, or may be incapable of clearly viewing detailed content presented on the panoramic visual content presentation device 3 due to an excessively long distance to the panoramic visual content presentation device.

When the panoramic visual content presentation device 3 presents the panoramic visual content, the panoramic visual content may be presented according to a change in an angle (that is, a change in an angle between a connection line and a plane in which the panoramic visual content presentation device 3 is located, where the connection line is between the viewer 4 and a center of the panoramic visual content presentation device 3) of the viewer 4 relative to the panoramic visual content presentation device 3. For example, if the viewer 4 moves from one side to another side of the panoramic visual content presentation device 3, the angle between the connection line and the plane in which the panoramic visual content presentation device 3 is located gradually increases, where the connection line is between the viewer 4 and the center of the panoramic visual content presentation device 3. For example, as shown in FIG. 3c, if a point A moves along a straight line 30 to a point B, the panoramic visual content presentation device 3 presents the panoramic visual content in a photographing order of the panoramic visual content. If the viewer 4 moves from the another side to the one side of the panoramic visual content presentation device 3, the angle between the connection line and the plane in which the panoramic visual content presentation device 3 is located gradually decreases, where the connection line is between the viewer 4 and the center of the panoramic visual content presentation device 3. For example, as shown in FIG. 3c, if the point B moves along the straight line 30 to the point A, the panoramic visual content presentation device 3 presents the panoramic visual content in an order reverse to the photographing order of the panoramic visual content.

It should be noted that the implementation scenarios shown in FIG. 3a to FIG. 3c are merely examples, and the present invention is not limited thereto.

Figure 4:
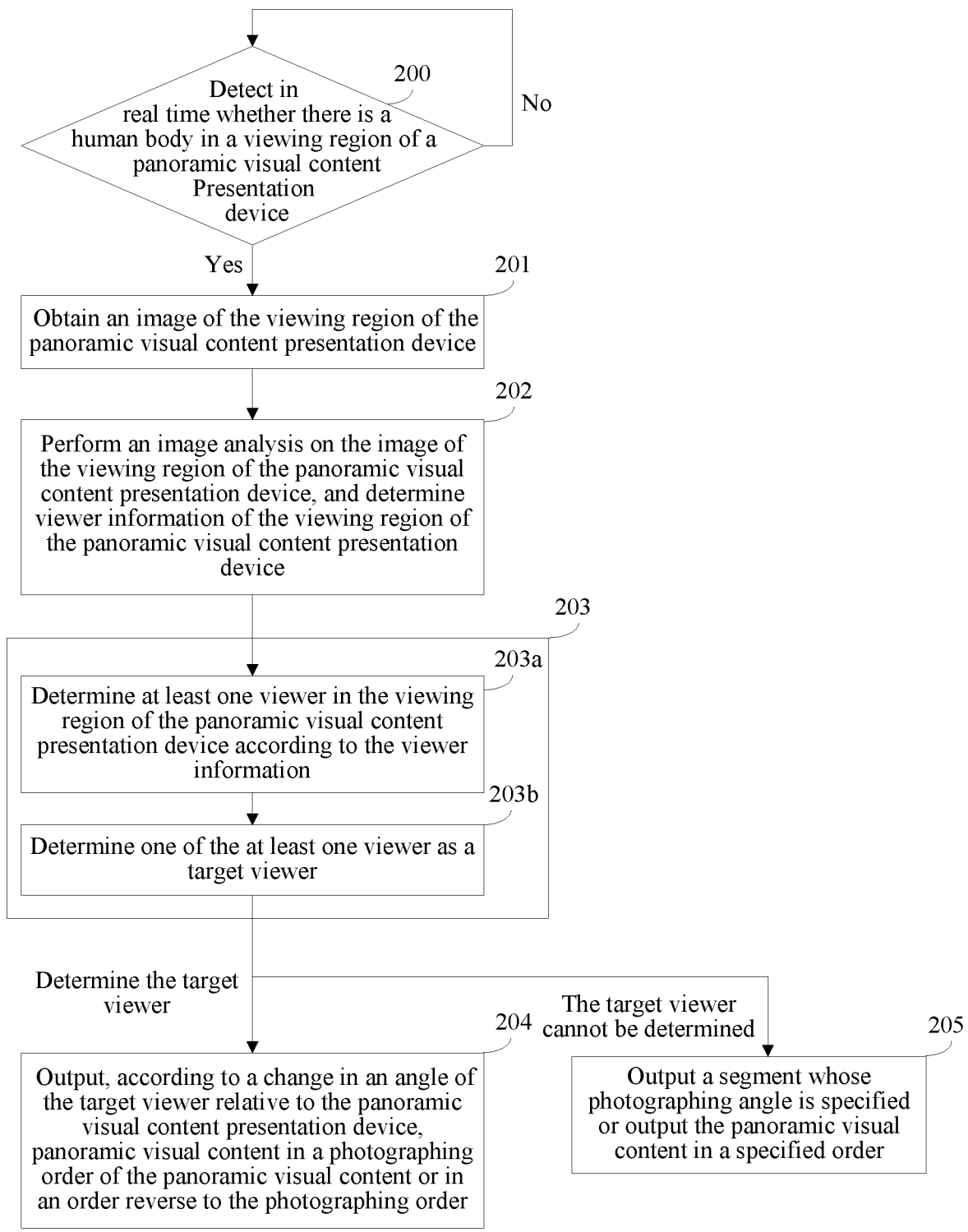
FIG. 4 is a flowchart of the method for presenting panoramic visual content according to Embodiment 2 of the present invention.

Specifically, referring to FIG. 4, the method includes the following steps.

Step 200: Detect in real time whether there is a human body in the viewing region of the panoramic visual content presentation device.

In this embodiment, the panoramic visual content presentation device is a device that cannot be directly touched during viewing, that is, a shortest distance between the viewing region and the panoramic visual content presentation device is greater than a distance between a human eye and an arm. During actual application, a panoramic visual content presentation device may be a display device ranging from tens to hundreds of inches, for example, a television of tens of inches at home or a display screen of hundreds of inches in a public place. In this case, a shortest distance between the viewing region and the panoramic visual content presentation device usually ranges from several meters to tens of meters and is greater than the distance between the human eye and the arm, and a person cannot directly touch the panoramic visual content presentation device during viewing.

The viewing region of the panoramic visual content presentation device is a region that is in front of the panoramic visual content presentation device and whose distance to the panoramic visual content presentation device is in a range such as the rectangular region 20 shown in FIG. 3c.

It should be noted that step 200 is an optional step. If a human body is detected in the viewing region of the panoramic visual content presentation device when step 200 is performed, step 201 is performed; otherwise, step 200 is always performed. Step 201 is always performed when step 200 is not performed.

During actual application, a human body may be detected by using a human body sensor (such as an infrared sensor). A detection region of the human body sensor may be implemented by setting a sensitivity of the human body sensor. During actual application, the sensitivity of the human body sensor may be regulated, so that the detection region of the human body sensor is basically the same as the viewing region of the panoramic visual content presentation device. Compared with a device (for example, a camera shooting device is used to obtain an image) that implements step 201, the human body sensor has less power consumption and lower costs. Therefore, in this embodiment, by performing step 200, step 201 may be prevented from being always performed. On one hand, the power consumption is reduced. On the other hand, the device that implements step 201 is prevented from being damaged due to long working hours, thereby reducing device replacement expenses, and implementing low costs. It is easy to know that in another embodiment, step 201 may be directly performed without performing step 200.

The human body sensor may transmit a detection result to a processor by using a serial port. For example, one indicates that a human body is detected in the viewing region of the panoramic visual content presentation device, and zero indicates that no human body is detected in the viewing region of the panoramic visual content presentation device.

Step 201: Obtain an image of the viewing region of the panoramic visual content presentation device.

During actual application, the image of the viewing region of the panoramic visual content presentation device may be obtained by using a camera shooting device (such as a camera). A detection region of the camera is related to a model of the camera. During actual application, the detection region of the camera includes the viewing region of the panoramic visual content presentation device by selecting a camera of a suitable model, or even is basically the same as the viewing region of the panoramic visual content presentation device. When the detection region of the camera further includes a non-viewing region of the panoramic visual content presentation device, a processing region of the image may be set, so that the processor processes only the viewing region of the panoramic visual content presentation device in the image.

It should be noted that the image of the viewing region of the panoramic visual content presentation device usually is multiple images that include the entire viewing region and that are collected at specified time intervals.

Step 202: Perform an image analysis on the image of the viewing region of the panoramic visual content presentation device, and determine viewer information of the viewing region of the panoramic visual content presentation device.

In this embodiment, the viewer information may include a human body identified from the image of the viewing region of the panoramic visual content presentation device, a position of at least one human body in the image of the viewing region of the panoramic visual content presentation device, and an orientation of a human face of at least one human body in the image of the viewing region of the panoramic visual content presentation device.

Preferably, the viewer information may include a human body identified from the image of the viewing region of the panoramic visual content presentation device, a position of each human body in the image of the viewing region of the panoramic visual content presentation device, and an orientation of a human face of each human body in the image of the viewing region of the panoramic visual content presentation device.

During specific implementation, a human body may be identified from the image by using an algorithm (such as an AdaBoost algorithm) to further determine a position of the human body relative to the panoramic visual content presentation device, or a position of the human body relative to the viewing region of the panoramic visual content presentation device. It may be understood that a relative position relationship between the panoramic visual content presentation device and the viewing region of the panoramic visual content presentation device is fixed, and therefore the position of the human body relative to the panoramic visual content presentation device is in a one-to-one correspondence with the position of the human body relative to the viewing region of the panoramic visual content presentation device. The position of the human body relative to the viewing region of the panoramic visual content presentation device may be used to replace the position of the human body relative to the panoramic visual content presentation device when step 202 is performed.

It should be noted that the viewer information of the viewing region of the panoramic visual content presentation device is obtained in step 201 and step 202.

Step 203: Determine a target viewer according to the viewer information. Step 204 is performed when the target viewer is determined, and step 205 is performed when the target viewer cannot be determined.

In this embodiment, the target viewer may be one of viewers in the viewing region of the panoramic visual content presentation device. It is easy to know that as time goes by, the viewers change, and the target viewer also changes. For example, the target viewer is a person in a time period, and the target viewer is another person in another time period.

Specifically, step 203 may include the following steps.

Step 203a: Determine at least one viewer in the viewing region of the panoramic visual content presentation device according to the viewer information.

In this embodiment, a viewer is a human body in the viewing region of the panoramic visual content presentation device.

During actual application, all viewers in the viewing region of the panoramic visual content presentation device may be determined according to the viewer information.

Step 203b: Determine one of the at least one viewer as the target viewer.

It may be understood that to select only one viewer as the target viewer may implement presenting the panoramic visual content according to a requirement of the target viewer, so as to prevent the panoramic visual content from being incapable of being normally presented due to different position change trends of the viewers relative to the panoramic visual content presentation device, thereby providing a good presentation effect for the target viewer.

In this embodiment, the viewer is directly determined as the target viewer when there is one determined viewer.

When there are at least two determined viewers, step 203b may include:

determining one of the viewers as the target viewer according to at least one of the following determining manners:

a human face has faced toward the panoramic visual content presentation device;

a viewing angle is closest to 90°;

a distance to the panoramic visual content presentation device is the shortest;

the distance to the panoramic visual content presentation device decreases; or the distance to the panoramic visual content presentation device remains the same.

In this embodiment, that the human face has faced toward the panoramic visual content presentation device means that the human face of the viewer has been face-to-face with the panoramic visual content in a movement process of the viewer. For example, in a process in which the viewer moves from one side of the panoramic visual content presentation device to another side of the panoramic visual content presentation device, the viewer has turned the face to the panoramic visual content presentation device. For another example, in a process in which the viewer walks toward the panoramic visual content presentation device, the face keeps directly facing toward the panoramic visual content presentation device.

A viewing angle of a viewer is an angle between a connection line and a plane in which the panoramic visual content presentation device is located, where the connection line is between the viewer and a center of the panoramic visual content presentation device.

During specific implementation, human face feature point localization and identification may be performed on the image of the viewing region of the panoramic visual content presentation device by using an algorithm (such as an active shape model (Active Shape Model, ASM for short) algorithm), whether a human face faces toward the panoramic visual content presentation device is determined according to a localized human face feature point, and a viewer that has faced toward the panoramic visual content presentation device is determined according to an identification result.

The position of the human body relative to the panoramic visual content presentation device or the position of the human body relative to the viewing region of the panoramic visual content presentation device may be directly determined according to step 202, so as to further determine a viewer that is closest to a median line of the viewing region, where the median line is perpendicular to the panoramic visual content presentation device.

As described above, human face feature point identification may be performed on the image of the viewing region of the panoramic visual content presentation device by using an algorithm, and the position of the human body relative to the panoramic visual content presentation device is determined with reference to step 202, so as to further determine a change (increase, same, or decrease) in a distance between each viewer and the panoramic visual content presentation device.

Figure 5:
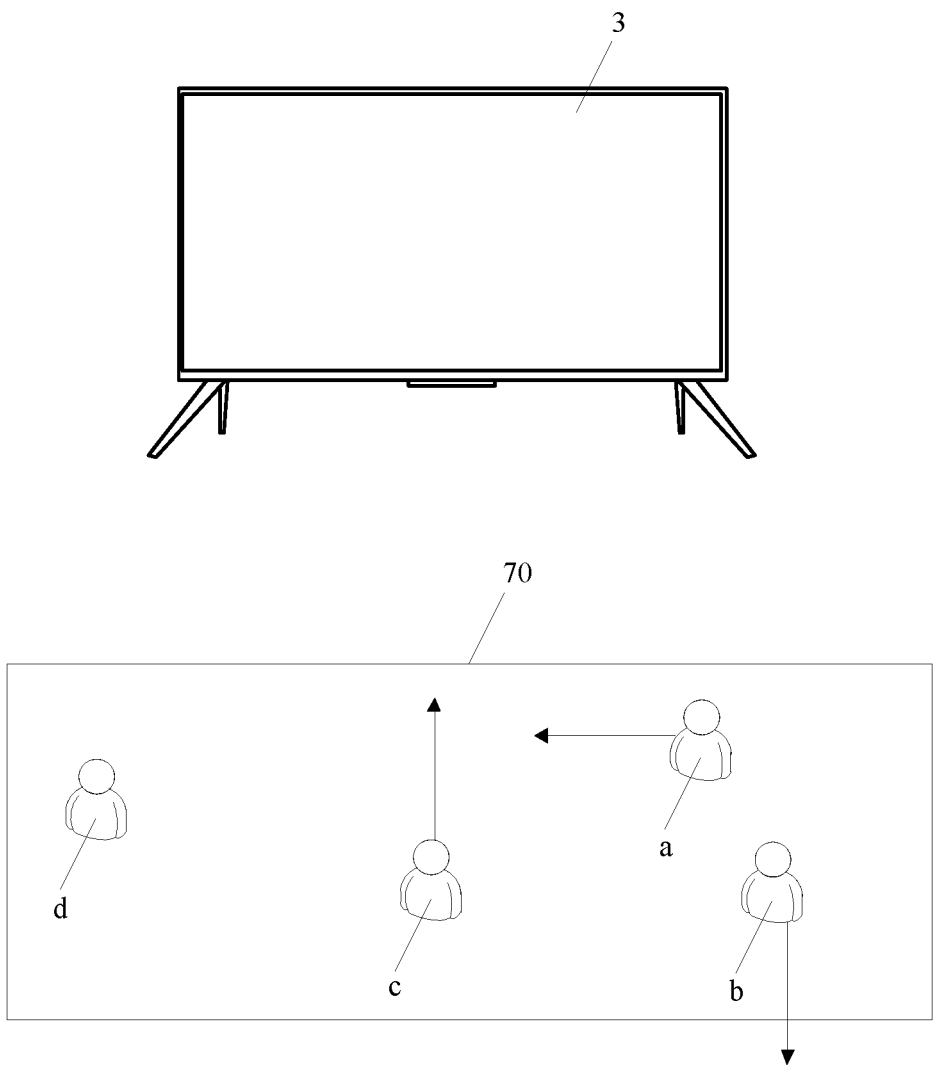
FIG. 5 is a schematic diagram of determining a target object according to Embodiment 2 of the present invention.

For example, four viewers a, b, c, and d are detected in a viewing region 70 of the panoramic visual content presentation device 3 shown in FIG. 5. Each viewer moves in an arrow direction. No arrow indicates no movement. The viewer a is closest to the panoramic visual content presentation device 3 and a distance between the viewer a and the panoramic visual content presentation device remains the same. A distance between the viewer b and the panoramic visual content presentation device increases. A distance between the viewer c and the panoramic visual content presentation device decreases. A distance between the viewer d and the panoramic visual content presentation device remains the same, and an angle (that is, a viewing angle) between a connection line and a plane in which the panoramic visual content presentation device is located also remains the same, where the connection line is between the viewer d and a center of the panoramic visual content presentation device. In comprehensive consideration of the foregoing conditions, one of the viewer a or the viewer c may be determined as the target viewer.

It may be understood that usually a human face of a human body faces toward the panoramic visual content presentation device only out of interest in the content presented on the panoramic visual content presentation device, and therefore that a human face has faced toward a panoramic visual content presentation device may be used as a condition for determining a target viewer. In addition, being closest to a median line that is of the viewing region and that is perpendicular to the panoramic visual content presentation device, being closest to the panoramic visual content presentation device, a distance to the panoramic visual content presentation device decreasing, and a distance to the panoramic visual content presentation device remaining the same all represent that the viewer may be interested in the content presented on the panoramic visual content presentation device, and these conditions are used as conditions for determining a target viewer, so as to select, from the viewers, a person interested in the content presented on the panoramic visual content presentation device and determine the person as the target viewer, and to present panoramic visual content according to a requirement of the target viewer, thereby providing a better visual feeling for the person interested in the content presented on the panoramic visual content presentation device, and improving user experience.

During actual application, the target viewer may be determined according to only one of the foregoing conditions.

In an implementation, step 203b may include:
determining a viewer whose human face has faced toward the panoramic visual content presentation device as the target viewer.

In another implementation, step 203b may include:
determining a viewer whose viewing angle is closest to 90° as the target viewer.

In still another implementation, step 203b may include:
determining a viewer that is closest to the panoramic visual content presentation device as the target viewer.

In yet another implementation, step 203b may include:
determining a viewer whose distance to the panoramic visual content presentation device decreases as the target viewer.

In still yet another implementation, step 203b may include:
determining a viewer whose distance to the panoramic visual content presentation device remains the same as the target viewer.

Alternatively, the target viewer may be determined according to multiple of the foregoing conditions.

Specifically, the target viewer may be determined by successively selecting conditions according to specified priorities.

In an implementation, step 203b may include:
determining a viewer whose distance to the panoramic visual content presentation device decreases as the target viewer; or
determining a viewer whose distance to the panoramic visual content presentation device remains the same as the target viewer when there is no viewer whose distance to the panoramic visual content presentation device decreases.

In another implementation, step 203b may include:
determining a viewer whose human face has faced toward the panoramic visual content presentation device as the target viewer; or
determining a viewer whose viewing angle is closest to 90° or a viewer that is closest to the panoramic visual content presentation device as the target viewer when there is no viewer whose human face has faced toward the panoramic visual content presentation device.

In still another implementation, step 203b may include:
determining a viewer whose distance to the panoramic visual content presentation device decreases as the target viewer;
determining a viewer whose distance to the panoramic visual content presentation device remains the same as the target viewer when there is no viewer whose distance to the panoramic visual content presentation device decreases; or
determining a viewer whose viewing angle is closest to 90° or a viewer that is closest to the panoramic visual content presentation device as the target viewer when there is no viewer whose distance to the panoramic visual content presentation device remains the same.

In yet another implementation, step 203b may include:
determining a viewer whose human face has faced toward the panoramic visual content presentation device as the target viewer;
determining a viewer whose distance to the panoramic visual content presentation device decreases as the target viewer when there is no viewer whose human face has faced toward the panoramic visual content presentation device;
determining a viewer whose distance to the panoramic visual content presentation device remains the same as the target viewer when there is no viewer whose distance to the panoramic visual content presentation device decreases; or
determining a viewer whose viewing angle is closest to 90° or a viewer that is closest to the panoramic visual content presentation device as the target viewer when there is no viewer whose distance to the panoramic visual content presentation device remains the same.

It should be noted that the foregoing several manners are merely examples, and the present invention is not limited thereto. During specific implementation, conditions for performing determining and an order in which determining is performed according to the conditions may be changed, and are not listed one by one herein.

Specifically, the same or different values may be allocated to various conditions, so as to determine the target viewer by comparing values that meet the conditions.

In an implementation, step 203b may include:
determining whether a human face of each viewer has faced toward the panoramic visual content presentation device, whether a viewing angle is closest to 90°, whether a distance to the panoramic visual content presentation device is the shortest, whether the distance to the panoramic visual content presentation device decreases, or whether the distance to the panoramic visual content presentation device remains the same;
increasing a determining value of a viewer by x when a human face of the viewer has faced toward the panoramic visual content presentation device;
increasing the determining value of the viewer by x when a viewing angle of the viewer is closest to 90°;
increasing the determining value of the viewer by x when the viewer is closest to the panoramic visual content presentation device;
increasing the determining value of the viewer by x when a distance between the viewer and the panoramic visual content presentation device decreases;
increasing the determining value of the viewer by x when the distance between the viewer and the panoramic visual content presentation device remains the same; or
determining a viewer whose determining value is the largest as the target viewer.

An initial determining value of each viewer is zero, and x is a fixed value.

In another implementation, step 203b may include:
determining whether a human face of each viewer has faced toward the panoramic visual content presentation device, whether a viewing angle is closest to 90°, whether a distance to the panoramic visual content presentation device is the shortest, whether the distance to the panoramic visual content presentation device decreases, or whether the distance to the panoramic visual content presentation device remains the same;
increasing a determining value of a viewer by 5×x when a human face of the viewer has faced toward the panoramic visual content presentation device;
increasing the determining value of the viewer by 4×x when a viewing angle of the viewer is closest to 90°;

increasing the determining value of the viewer by 4×x when the viewer is closest to the panoramic visual content presentation device;

increasing the determining value of the viewer by 2×x when a distance between the viewer and the panoramic visual content presentation device decreases;

increasing the determining value of the viewer by x when the distance between the viewer and the panoramic visual content presentation device remains the same; or determining a viewer whose determining value is the largest as the target viewer.

It should be noted that when there are more than one viewer meeting the conditions finally, any viewer may be selected and determined as the target viewer.

In an implementation of this embodiment, the method may further include:

replacing the target viewer when the target viewer meets at least one of the following conditions:

a distance to the panoramic visual content presentation device increases;

the viewing angle remains the same; or the target viewer is not in the viewing region.

Figure 6:
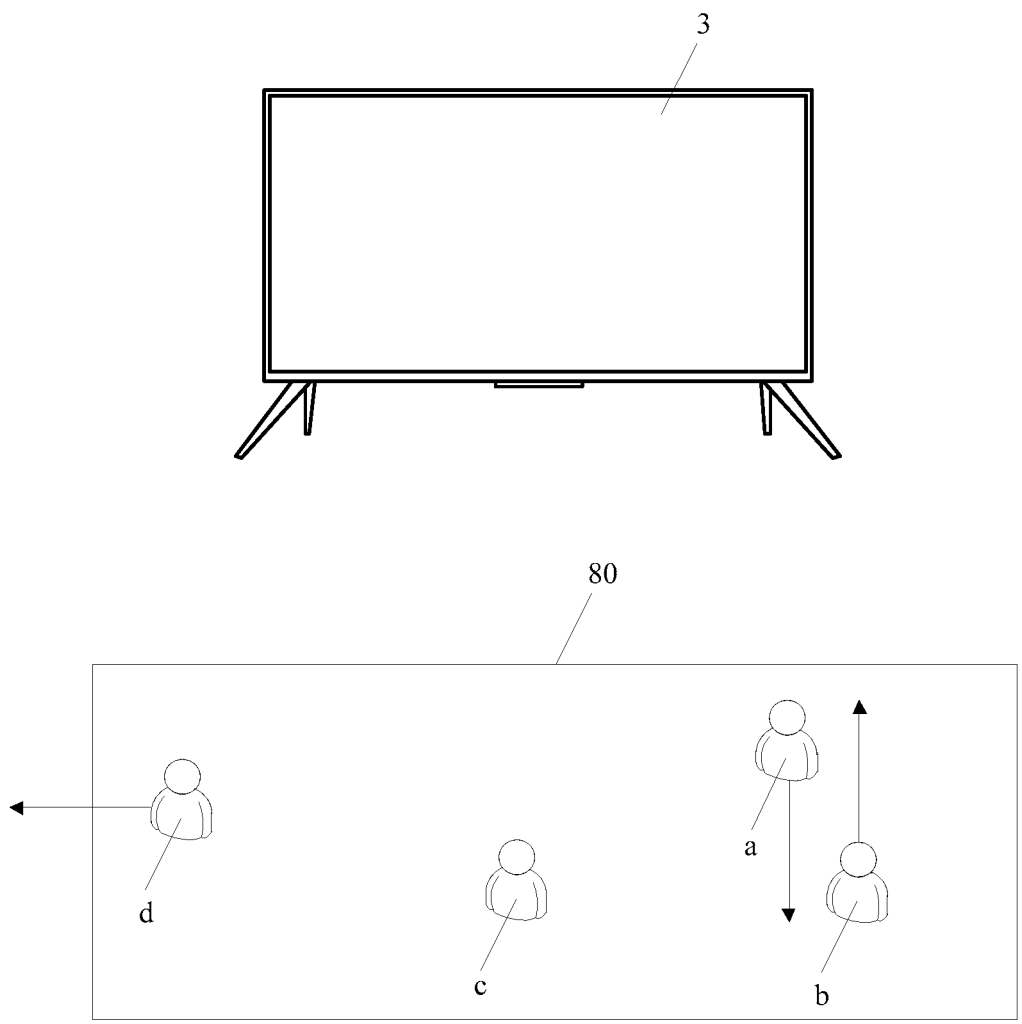
FIG. 6 is a schematic diagram of replacing a target object according to Embodiment 2 of the present invention.

For example, four viewers a, b, c, and d are detected in a viewing region 80 of the panoramic visual content presentation device 3 shown in FIG. 6. The viewer a is already determined as a target viewer. In a process in which panoramic visual content is presented according to a change in a position of the viewer a relative to the panoramic visual content presentation device 3, if a distance between the viewer a and the panoramic visual content presentation device increases, it indicates that the viewer a may already be not interested in the panoramic visual content. In this case, the viewer a may be replaced with one of the viewers b, c, or d to be determined as the target viewer.

It should be noted that in a process in which a viewing angle is changed, if the distance between the target viewer and the panoramic visual content presentation device increases, the target viewer may not be replaced in this case, so as to prevent experience of the target viewer from being destroyed.

It may be understood that the increase in the distance to the panoramic visual content presentation device may indicate that the target viewer is not interested in the content presented on the panoramic visual content presentation device. In this case, the target viewer is replaced with a viewer interested in the content presented on the panoramic visual content presentation device, so as to provide a better visual feeling in time for the person interested in the content presented on the panoramic visual content presentation device (to present the panoramic visual content according to a requirement of the person interested in the content presented on the panoramic visual content presentation device), and improve user experience.

If the viewing angle of the target viewer remains the same, a presentation effect of the panoramic visual content cannot be achieved. In this case, the target viewer is replaced, so as to provide a better visual feeling for the viewer (to present the panoramic visual content according to a change in a position of the viewer), and improve user experience.

If being not in the viewing region, the person cannot view the content presented on the panoramic visual content presentation device. In addition, the panoramic visual content presentation device cannot present the panoramic visual content according to a change in a position of the person either. In this case, the target viewer is replaced in time, so as to provide a better visual feeling for a person interested in the content presented on the panoramic visual content presentation device (to present the panoramic visual content according to a requirement of the person interested in the content presented on the panoramic visual content presentation device), and improve user experience.

In another implementation of this embodiment, the method may further include:

replacing the target viewer when the target viewer meets at least one of the following conditions:

a distance to the panoramic visual content presentation device increases; or the target viewer is not in the viewing region.

In still another implementation of this embodiment, the method may further include:

replacing the target viewer when the target viewer meets at least one of the following conditions:

the viewing angle remains the same; or the target viewer is not in the viewing region.

In yet another implementation of this embodiment, the method may further include:

replacing the target viewer when the target viewer is not in the viewing region.

It may be understood that in the foregoing implementations, the method may further include:

outputting, after the target viewer is replaced and according to a change in a position of a replacement target viewer relative to the panoramic visual content presentation device, panoramic visual content in a photographing order of the panoramic visual content or in an order reverse to the photographing order.

During actual application, step 204 continues to be performed if the target viewer is not replaced.

Optionally, the method may further include:

determining a replaced target viewer according to one or more of: whether a human face of a viewer has faced toward the panoramic visual content presentation device, a viewing angle of the viewer, or a distance between the viewer and the panoramic visual content presentation device.

During specific implementation, a determining condition for determining a replaced target viewer may be the same as that for determining the target viewer in step 203b, and details are not described herein again.

Step 204: Output, according to a change in an angle of the target viewer relative to the panoramic visual content presentation device, panoramic visual content in a photographing order of the panoramic visual content or in an order reverse to the photographing order.

In this embodiment, panoramic visual content refers to visual content that is photographed in a photographing process correspondingly according to a position change process in which a position of a photographing device relative to a photographed object is changed (for example, a photographing angle or a photographing distance is changed). The visual content is content visually sensed by a human body, for example, an image or a video.

To output the panoramic visual content in the photographing order of the panoramic visual content is to reproduce visual content photographed in a change process of a photographing device relative to a photographed object. To output the panoramic visual content in the order reverse to the photographing order of the panoramic visual content is to play, in a reverse manner, the visual content photographed in the change process of the photographing device relative to the photographed object. For example, if the photographed object moves from the top down during photographing, an effect obtained through playing in this case is that the photographed object moves from the bottom up.

Outputting the panoramic visual content according to a change in a position of the target viewer relative to the panoramic visual content presentation device may be, when the target viewer moves from one side to another side of the panoramic visual content presentation device, outputting the panoramic visual content in the photographing order of the panoramic visual content, and when the target viewer moves from the another side to the one side of the panoramic visual content presentation device, outputting the panoramic visual content in an order reverse to the photographing order of the panoramic visual content.

Preferably, step 204 may include:

determining a viewing angle of the target viewer in real time, where the viewing angle of the target viewer is an angle between a connection line and a plane in which the panoramic visual content presentation device is located, and the connection line is between the target viewer and a center of the panoramic visual content presentation device; and outputting segments whose photographing angles correspond to viewing angles of the target viewer, where the multiple consecutive segments form the panoramic visual content.

Optionally, the segment may be an image or a video presented on the panoramic visual content presentation device.

In this embodiment, that the photographing angle corresponds to the viewing angle of the target viewer means that a ratio of a photographing angle of a current segment (an angle between two connection lines, where one is between the photographing device and the photographed object currently, and the other is between the photographing device and the photographed object at the beginning or at the end of the photographing) to a maximum difference among photographing angles of segments (an angle between two connection lines, where one is between the photographing device and the photographed object at the beginning of the photographing, and the other is between the photographing device and the photographed object at the end of the photographing) is equal to a ratio of a current viewing angle of the target viewer (an angle between two connection lines, where one is between the target viewer and a center of the panoramic visual content presentation device currently, and the other is between one side of the viewing region and the center of the panoramic visual content presentation device) to a display angle of the panoramic visual content presentation device (an angle between two connection lines, where the two connection lines are respectively between two sides of the viewing region and the center of the panoramic visual content presentation device).

Figure 7:
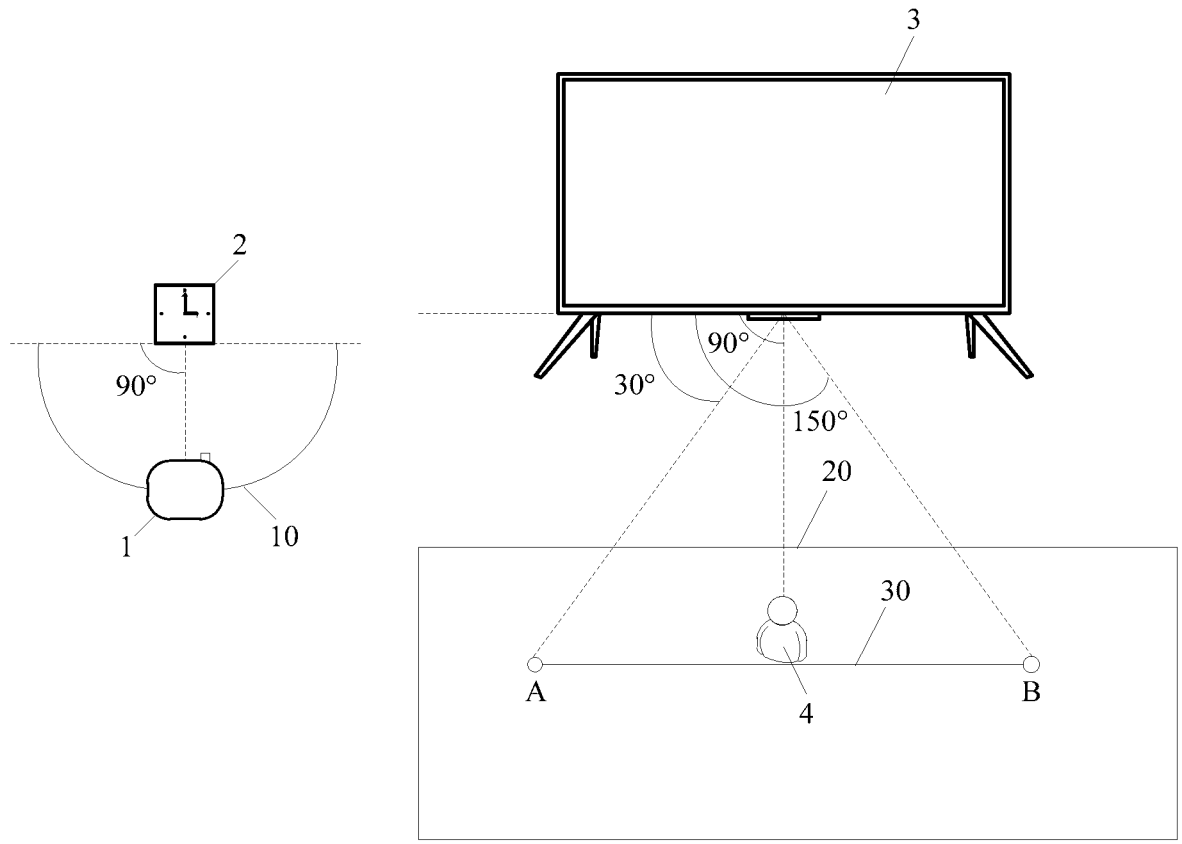
FIG. 7 is a comparison diagram when angles are the same according to Embodiment 2 of the present invention.

Using FIG. 7 as an example, an angle between a connection line and a plane in which the panoramic visual content presentation device 3 is located is 90°, where the connection line is between the target viewer 4 and a center of the panoramic visual content presentation device 3, angles between connection lines and the plane in which the panoramic visual content presentation device 3 is located are respectively 30° and 150°, where the connection lines are respectively between two sides of the viewing region 20 and the center of the panoramic visual content presentation device 3, a current viewing angle of the target viewer 4 is 90°−30°=60°, and a display angle of the panoramic visual content presentation device 3 is 150°−30°=120°. A ratio of a photographing angle of a current segment to a maximum difference among photographing angles of segments, that is, a ratio of the current viewing angle of the target viewer 4 to the display angle of the panoramic visual content presentation device 3 is 60°/120°=0.5. An angle between connection lines between the photographing device 1 and the photographed object 2 at the beginning of the photographing and at the end of the photographing, that is, a maximum difference among photographing angles of the segments is 180°, and an angle between two connection lines, where one is between the photographing device 1 and the photographed object 2 currently, and the other is between the photographing device 1 and the photographed object 2 at the beginning or at the end of the photographing, that is, a photographing angle of the current segment is 180°×0.5=90°.

It may be understood that to output segments whose photographing angles correspond to viewing angles of the target viewer is to make a display scenario correspond to a photographing scenario. As shown in FIG. 7, an immersive feeling of a user during viewing is improved, and user experience is further improved.

During actual application, an angle between a connection line and a plane in which a panoramic visual content presentation device is located is also obtained according to an image of a viewing region of the panoramic visual content presentation device, where the connection line is between a target viewer and a center of the panoramic visual content presentation device. Specifically, a position of the target viewer relative to the panoramic visual content presentation device is first determined according to the image of the viewing region of the panoramic visual content presentation device, and then an angle, for example, an angle α that is shown in FIG. 3c and that is between the connection line and the plane in which the panoramic visual content presentation device is located is determined according to the position of the target viewer relative to the panoramic visual content presentation device, where the connection line is between the target viewer and the center of the panoramic visual content presentation device.

It should be noted that in a process of presenting the panoramic visual content to the target viewer, the image of the viewing region of the panoramic visual content presentation device is obtained in real time or every specified time, so as to determine a change in the angle between the connection line and the plane in which the panoramic visual content presentation device is located, where the connection line is between the target viewer and a center of the panoramic visual content presentation device, and further output the panoramic visual content in a photographing order of the panoramic visual content or in an order reverse to the photographing order.

During specific implementation, a movement angle of the photographing device may be recorded while the panoramic visual content is photographed (for example, implementing by using a gyro sensor), so as to further finally determine ratios of photographing angles of segments to a maximum difference among the photographing angles of the segments. When ratios of viewing angles of the target viewer to the display angle of the panoramic visual content presentation device is determined, segments are correspondingly output, where ratios between photographing angles of the output segments to the maximum difference among the photographing angles of the segments are the same. Because the viewing angle of the target viewer continuously changes, and the display angle of the panoramic visual content presentation device is fixed, the ratios of the viewing angles of the target viewer to the display angle of the panoramic visual content presentation device change continuously, ratios of the photographing angles to the maximum difference among the photographing angles of the segments also continuously change, the maximum difference among the photographing angles of the segments is determined, and the output photographing angles of the segments also continuously change, and is consistent with the photographing order of the panoramic visual content.

In another embodiment, that a photographing angle of a segment corresponds to a viewing angle of the target viewer may mean that a photographing angle of a current segment is equal to a current viewing angle of the target viewer, or may mean that a change amplitude of the photographing angle of the current segment is equal to a change amplitude of a viewing angle of the target viewer.

During actual application, step 204 may include:

determining a viewing angle and a viewing distance of the target viewer in real time; and when the viewing angle of the target viewer changes, outputting segments whose photographing angles correspond to viewing angles of the target viewer, where the viewing angle of the target viewer is an angle between a connection line and a plane in which the panoramic visual content presentation device is located, and the connection line is between the target viewer and a center of the panoramic visual content presentation device; or when the viewing angle of the target viewer remains the same, outputting segments whose photographing distances correspond to viewing distances of the target viewer, where the viewing distance of the target viewer is a distance between the target viewer and the panoramic visual content presentation device.

Panoramic visual content includes multiple consecutive segments.

Optionally, the segment may be an image or a video presented on the panoramic visual content presentation device.

It may be understood that in the foregoing implementations, the panoramic visual content may be presented according to the changes in the viewing angle and the viewing distance, and mainly according to the change in the viewing angle.

Step 205: Output segments whose photographing angles are specified or output the panoramic visual content in a specified order.

In this embodiment, panoramic visual content includes multiple consecutive segments.

Optionally, the segment may be an image or a video presented on the panoramic visual content presentation device.

It may be understood that when the target viewer cannot be determined, the panoramic visual content is output in a specified manner (a specified photographing angle or an specified order), so that the panoramic visual content can be presented when there is no viewer or when the target viewer cannot be determined due to reasons such as excessive viewers, thereby attracting a potential viewer.

In this embodiment of the present invention, viewer information of a viewing region of a panoramic visual content presentation device is obtained, a target viewer is determined according to the viewer information, and panoramic visual content is output in a photographing order of the panoramic visual content or in an order reverse to the photographing order and according to a change in a position of the target viewer relative to the panoramic visual content presentation device, so that the panoramic visual content is presented, according to the change in the position of the target viewer relative to the panoramic visual content presentation device and according to a requirement of the target viewer on the panoramic content presentation device that cannot be directly touched during viewing, thereby bringing a satisfactory presentation effect and good user experience.

Embodiment 3

An embodiment of the present invention provides a method for presenting panoramic visual content. In this embodiment, a change in a position of a target viewer relative to a panoramic visual content presentation device is a change in a distance between the target viewer and the panoramic visual content presentation device.

Figure 8A:
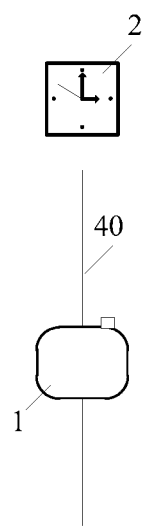
FIG. 8a to FIG. 8c are implementation scenario diagrams of a method for presenting panoramic visual content according to Embodiment 3 of the present invention.
Figure 8B:
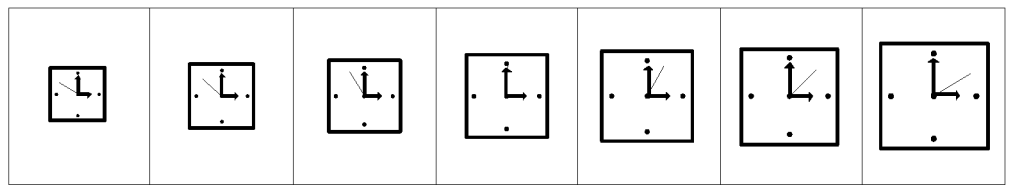
Figure 8C:
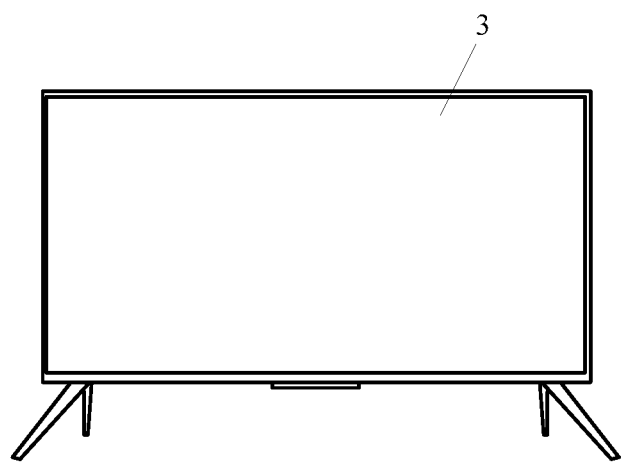
Figure 8C:
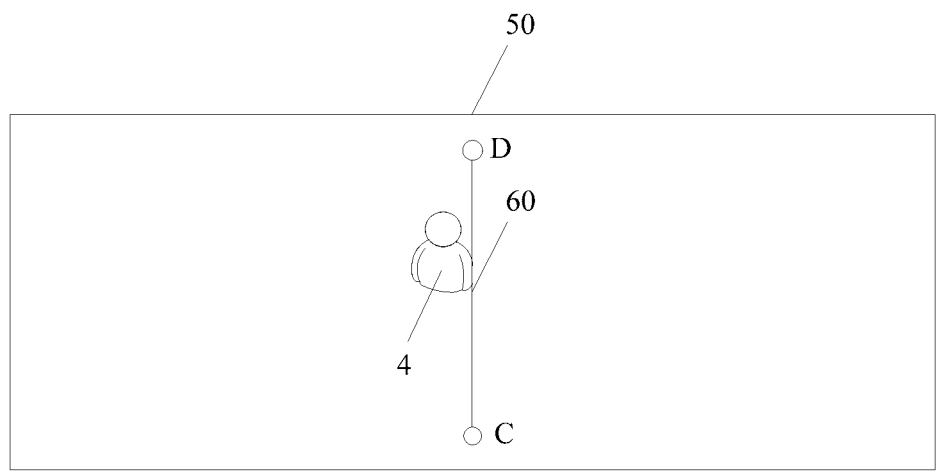

With reference to FIG. 8*a* to FIG. 8*c*, the following first describes, by using an example, an implementation scenario of the method for presenting panoramic visual content provided in this embodiment.

FIG. 8*a* shows another photographing scenario of panoramic visual content. As shown in FIG. 8*a*, a photographing device 1 photographs a photographed object 2 by keeping a photographing angle and continuously changing a photographing distance. Specifically, the photographing device 1 moves along a straight line 40 shown in FIG. 8*a*. Likewise, the photographing device 1 photographs the photographed object 2 in the movement process by keeping a lens directly facing toward the photographed object 2, and obtains panoramic visual content. The photographed object 2 may take an action in the photographing process. In this case, the action of the photographed object continuously changes together with the photographing distance. A position of a second hand of a clock shown in FIG. 8*b* synchronously changes with the photographing distance.

FIG. 8*c* shows another present scenario of the panoramic visual content. As shown in FIG. 8*c*, a panoramic visual content presentation device 3 presents panoramic visual content to a viewer 4. A rectangular region 50 is a viewing region of the panoramic visual content presentation device 3. The viewer 4 needs to view the panoramic visual content presented on the panoramic visual content presentation device 3 in the rectangular region 50.

When the panoramic visual content presentation device 3 presents the panoramic visual content, the panoramic visual content may be presented according to a change in a distance of the viewer 4 relative to the panoramic visual content presentation device 3. For example, if the viewer 4 moves toward the panoramic visual content presentation device 3, content displayed on the panoramic visual content display device 3 gradually reduces. For example, as shown in FIG. 8*c*, if moving from a point C along a straight line 60 to a point D, the panoramic visual content presentation device 3 presents the panoramic visual content in a photographing order of the panoramic visual content. If the viewer 4 is far away from the panoramic visual content presentation device 3, the panoramic visual content presentation device 3 gradually increases. For example, as shown in FIG. 8*c*, if moving from the point D along the straight line 60 to the point C, the panoramic visual content presentation device 3 presents the panoramic visual content in an order reverse to the photographing order of the panoramic visual content.

It should be noted that the implementation scenarios shown in FIG. 8*a* to FIG. 8*c* are merely examples, and the present invention is not limited thereto.

In addition, during actual application, when panoramic visual content is photographed, only a photographing angle of the photographing device may be changed relative to the photographed object, or only a photographing distance is changed, or both the photographing angle and the photographing distance are changed. The panoramic visual content presentation device may be set according to an actual status, so as to select one of the following two present manners: presenting panoramic visual content according to a change in an angle of a viewer relative to the panoramic visual content presentation device, or presenting the panoramic visual content according to a change in a distance of the viewer relative to the panoramic visual content presentation device. For example, when a change amplitude of a photographing angle is greater than a change amplitude of a photographing distance, panoramic visual content is presented according to the change in the angle of the viewer relative to the panoramic visual content presentation device. For another example, when the photographing angle is changed, the panoramic visual content is presented according to the change in the angle of the viewer relative to the panoramic visual content presentation device.

Figure 9:
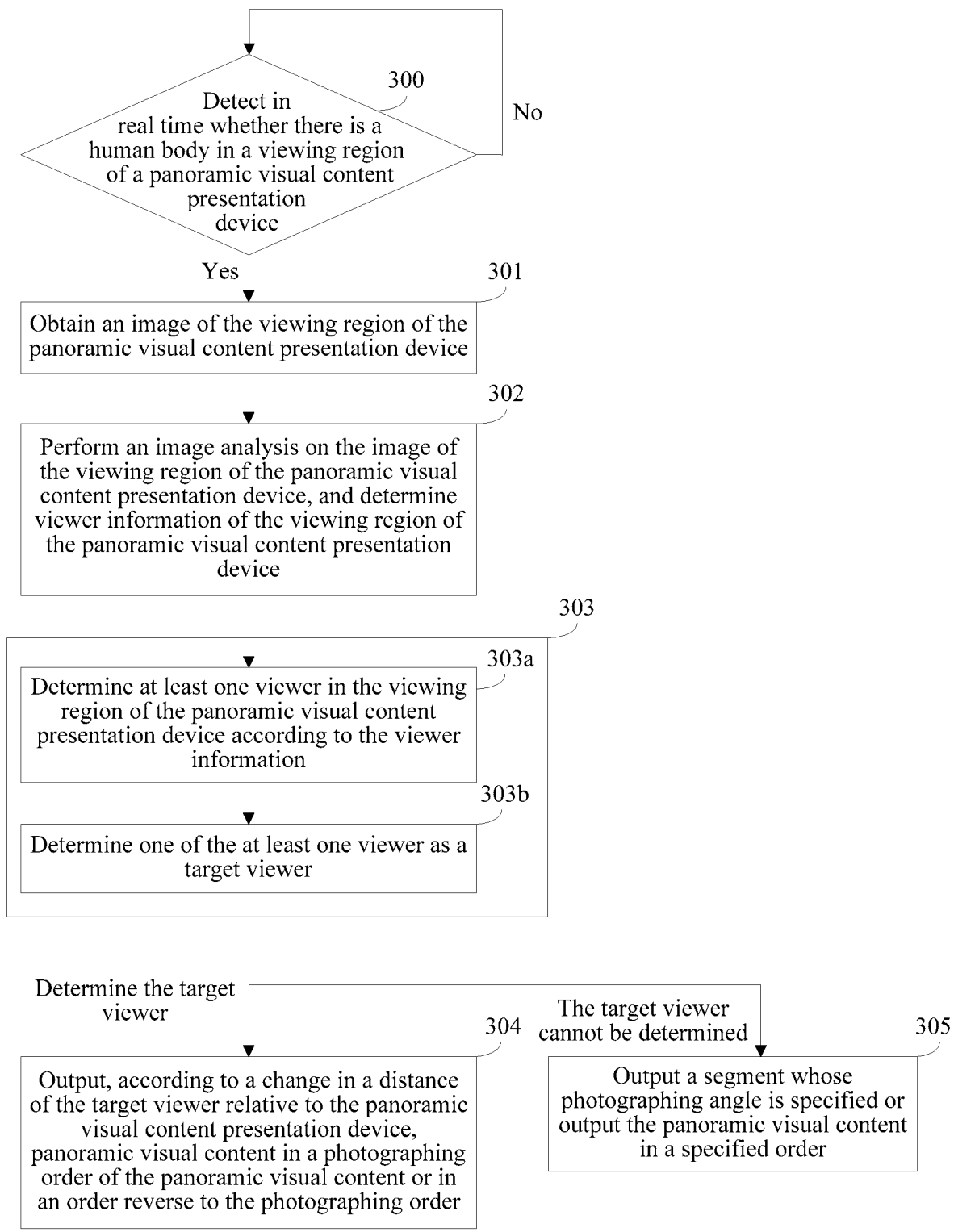
FIG. 9 is a flowchart of the method for presenting panoramic visual content according to Embodiment 3 of the present invention.

Specifically, referring to FIG. 9, the method includes the following steps.

Step 300: Detect in real time whether there is a human body in the viewing region of the panoramic visual content presentation device.

Optionally, step 300 may be the same as step 200, and details are not described herein again.

Step 301: Obtain an image of the viewing region of the panoramic visual content presentation device.

Optionally, step 301 may be the same as step 201, and details are not described herein again.

Step 302: Perform an image analysis on the image of the viewing region of the panoramic visual content presentation device, and determine viewer information of the viewing region of the panoramic visual content presentation device.

Optionally, step 302 may be the same as step 202, and details are not described herein again.

Step 303: Determine a target viewer according to the viewer information. Step 304 is performed when a target viewer is determined, or step 305 is performed when a target viewer cannot be determined.

Specifically, step 303 may include the following steps.

Step 303a: Determine at least one viewer in the viewing region of the panoramic visual content presentation device according to the viewer information.

Optionally, step 303a may be the same as step 203a, and details are not described herein again.

Step 303b: Determine one of the at least one viewer as the target viewer.

In this embodiment, the viewer is directly determined as the target viewer when there is one determined viewer.

When there are at least two determined viewers, step 303b may include:

determining one of the viewers as the target viewer according to at least one of the following determining manners:

a human face has faced toward the panoramic visual content presentation device;

a distance to the panoramic visual content presentation device is the shortest;

a viewing angle is closest to 90°;

the viewing angle is close to 90°; or the viewing angle remains the same.

In a preferred implementation, step 303b may include:

determining a viewer whose viewing angle is close to 90° as the target viewer; or determining a viewer whose viewing angle remains the same as the target viewer when there is no viewer whose viewing angle is close to 90°.

In another preferred implementation, step 303b may include:

determining a viewer whose human face has faced toward the panoramic visual content presentation device as the target viewer; or determining a viewer that is closest to the panoramic visual content presentation device or a viewer whose viewing angle is closest to 90° as the target viewer when there is no viewer whose human face has faced toward the panoramic visual content presentation device.

In still another preferred implementation, step 303b may include:

determining a viewer whose viewing angle is close to 90° as the target viewer;

determining a viewer whose viewing angle remains the same as the target viewer when there is no viewer whose viewing angle is close to 90°; or determining a viewer that is closest to the panoramic visual content presentation device or a viewer whose viewing angle is closest to 90° as the target viewer when there is no viewer whose viewing angle remains the same.

In yet another preferred implementation, step 303b may include:

determining a viewer whose human face has faced toward the panoramic visual content presentation device as the target viewer;

determining a viewer whose viewing angle is close to 90° as the target viewer when there is no viewer whose human face has faced toward the panoramic visual content presentation device;

determining a viewer whose viewing angle remains the same as the target viewer when there is no viewer whose viewing angle is close to 90°; or determining a viewer that is closest to the panoramic visual content presentation device or a viewer whose viewing angle is closest to 90° as the target viewer when there is no viewer whose viewing angle remains the same.

In still yet another preferred implementation, step 303b may include:

determining whether a human face of each viewer has faced toward the panoramic visual content presentation device, whether a distance to the panoramic visual content presentation device is the shortest, whether a viewing angle is closest to 90°, whether the viewing angle is close to 90°, and whether the viewing angle remains the same;

increasing a determining value of a viewer by x when a human face of the viewer has faced toward the panoramic visual content presentation device;

increasing the determining value of the viewer by x when the viewer is closest to the panoramic visual content presentation device;

increasing the determining value of the viewer by x when a viewing angle of the viewer is closest to 90°;

increasing the determining value of the viewer by x when the viewing angle of the viewer is close to 90°;

increasing the determining value of the viewer by x when the viewing angle of the viewer remains the same; and determining a viewer whose determining value is the largest as the target viewer.

An initial determining value of each viewer is zero, and x is a fixed value.

In a further preferred implementation, step 303b may include:

determining whether a human face of each viewer has faced toward the panoramic visual content presentation device, whether a distance to the panoramic visual content presentation device is the shortest, whether a viewing angle is closest to 90°, whether the viewing angle is close to 90°, and whether the viewing angle remains the same;

increasing a determining value of a viewer by 5×x when a human face of the viewer has faced toward the panoramic visual content presentation device;

increasing the determining value of the viewer by 4×x when the viewer is closest to the panoramic visual content presentation device;

increasing the determining value of the viewer by 4×x when a viewing angle of the viewer is closest to 90°;

increasing the determining value of the viewer by 2×x when the viewing angle of the viewer is close to 90°;

increasing the determining value of the viewer by x when the viewing angle of the viewer remains the same; and determining a viewer whose determining value is the largest as the target viewer.

An initial determining value of each viewer is zero, and x is a fixed value.

It should be noted that the foregoing several preferred manners are merely examples, and the present invention is not limited thereto. During specific implementation, conditions for performing determining and a determining order of the conditions may be replaced, and are not listed one by one herein.

In an implementation of this embodiment, the method may further include:

replacing the target viewer when the target viewer meets at least one of the following conditions:

the viewing angle is far away from 90°;

a distance to the panoramic visual content presentation device remains the same; or the target viewer is not in the viewing region.

In another implementation of this embodiment, the method may further include:

replacing the target viewer when the target viewer meets at least one of the following conditions:

the viewing angle is far away from 90°; or the target viewer is not in the viewing region.

In still another implementation of this embodiment, the method may further include:

replacing the target viewer when the target viewer meets at least one of the following conditions:

a distance to the panoramic visual content presentation device remains the same; or the target viewer is not in the viewing region.

In yet another implementation of this embodiment, the method may further include:

replacing the target viewer when the target viewer is not in the viewing region.

It may be understood that in the foregoing implementations, the method may further include:

outputting, after the target viewer is replaced and according to a change in a position of a replacement target viewer relative to the panoramic visual content presentation device, panoramic visual content in a photographing order of the panoramic visual content or in an order reverse to the photographing order.

During actual application, step 304 continues to be performed if the target viewer is not replaced.

Optionally, the method may further include:

determining a replaced target viewer according to one or more of: whether a human face of a viewer has faced toward the panoramic visual content presentation device, a viewing angle of the viewer, or a distance between the viewer and the panoramic visual content presentation device.

During specific implementation, a determining condition for determining a replaced target viewer may be the same as that for determining the target viewer in step 303*b*, and details are not described herein again.

Step 304: Output, according to a change in a distance of the target viewer relative to the panoramic visual content presentation device, panoramic visual content in a photographing order of the panoramic visual content or in an order reverse to the photographing order.

For example, when the target viewer moves toward the panoramic visual content presentation device, a distance between the target viewer and the panoramic visual content presentation device gradually decreases, and the panoramic visual content is output in a photographing order of the panoramic visual content. When the target viewer is far away from the panoramic visual content presentation device, the distance between the target viewer and the panoramic visual content presentation device gradually increases, and the panoramic visual content is output in an order reverse to the photographing order of the panoramic visual content.

Preferably, step 304 may include:

determining a viewing distance of the target viewer in real time, where the viewing distance of the target viewer is a distance between the target viewer and the panoramic visual content presentation device; and outputting segments whose photographing distances correspond to viewing distances of the target viewer, where the multiple consecutive segments form the panoramic visual content.

Optionally, the segments may be an image or a video presented on the panoramic visual content presentation device.

In this embodiment, that a photographing distance corresponds to a viewing distance of a target viewer means that a ratio of a photographing distance of a current segment (a distance difference between two distances, where one is a current distance between the photographing device and the photographed object, and the other is a distance between the photographing device and the photographed object at the beginning or at the end of the photographing) to a maximum difference among photographing distances of segments (a distance difference between two distances, where one is a distance between the photographing device and the photographed object at the beginning of the photographing, and the other is a distance between the photographing device and the photographed object at the end of the photographing) is equal to a ratio of a current viewing distance of the target viewer (a current distance between the target viewer and one side of the viewing region) to a display distance of the panoramic visual content presentation device (a distance between two sides of the viewing region).

In another embodiment, that a photographing distance of a segment corresponds to a viewing distance of visual content may mean that a photographing distance of a current segment is equal to a current viewing distance of a target viewer, or may mean that a change amplitude of a photographing distance of a segment is equal to a change amplitude of the viewing distance of the target viewer.

During actual application, step 304 may include:

determining a viewing angle and a viewing distance of the target viewer in real time; and when the viewing distance of the target viewer changes, outputting segments whose photographing distances correspond to viewing distances of the target viewer, where the viewing distance of the target viewer is a distance between the target viewer and the panoramic visual content presentation device; or when the viewing distance of the target viewer remains the same, outputting segments whose photographing angles correspond to viewing angles of the target viewer, where the viewing angle of the target viewer is an angle between a connection line and a plane in which the panoramic visual content presentation device is located, and the connection line is between the target viewer and a center of the panoramic visual content presentation device.

Panoramic visual content includes multiple consecutive segments.

Optionally, the segments may be an image or a video presented on the panoramic visual content presentation device.

It may be understood that in the foregoing implementations, the panoramic visual content may be presented according to the changes in the viewing angle and the viewing distance, and mainly according to the change in the viewing distance.

Step 305: Output segments whose photographing distances are specified or output the panoramic visual content in a specified order.

In this embodiment, panoramic visual content includes multiple consecutive segments.

Optionally, the segments may be an image or a video presented on the panoramic visual content presentation device.

Optionally, step 305 may be the same as step 205, and details are not described herein again.

In this embodiment of the present invention, viewer information of a viewing region of a panoramic visual content presentation device is obtained, a target viewer is determined according to the viewer information, and panoramic visual content is output in a photographing order of the panoramic visual content or in an order reverse to the photographing order and according to a change in a position of the target viewer relative to the panoramic visual content presentation device, so that the panoramic visual content is presented, according to the change in the position of the target viewer relative to the panoramic visual content presentation device and according to a requirement of the target viewer on the panoramic content presentation device that cannot be directly touched during viewing, thereby bringing a satisfactory presentation effect and good user experience.

Embodiment 4

Figure 10:
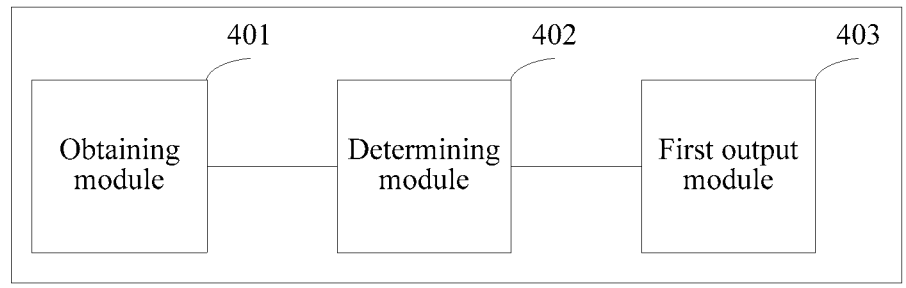
FIG. 10 is a schematic structural diagram of an apparatus for presenting panoramic visual content according to Embodiment 4 of the present invention.

An embodiment of the present invention provides an apparatus for presenting panoramic visual content. Referring to FIG. 10, the apparatus includes:

an obtaining module 401, configured to obtain viewer information of a viewing region of a panoramic visual content presentation device;

a determining module 402, configured to determine a target object according to the viewer information; and a first output module 403, configured to output, according to a change in a position of the target viewer relative to the panoramic visual content presentation device, panoramic visual content in a photographing order of the panoramic visual content or in an order reverse to the photographing order.

In this embodiment of the present invention, viewer information of a viewing region of a panoramic visual content presentation device is obtained, a target viewer is determined according to the viewer information, and panoramic visual content is output in a photographing order of the panoramic visual content or in an order reverse to the photographing order and according to a change in a position of the target viewer relative to the panoramic visual content presentation device, so that the panoramic visual content is presented, according to the change in the position of the target viewer relative to the panoramic visual content presentation device and according to a requirement of the target viewer on the panoramic content presentation device that cannot be directly touched during viewing, thereby bringing a satisfactory presentation effect and good user experience.

Embodiment 5

Figure 11:
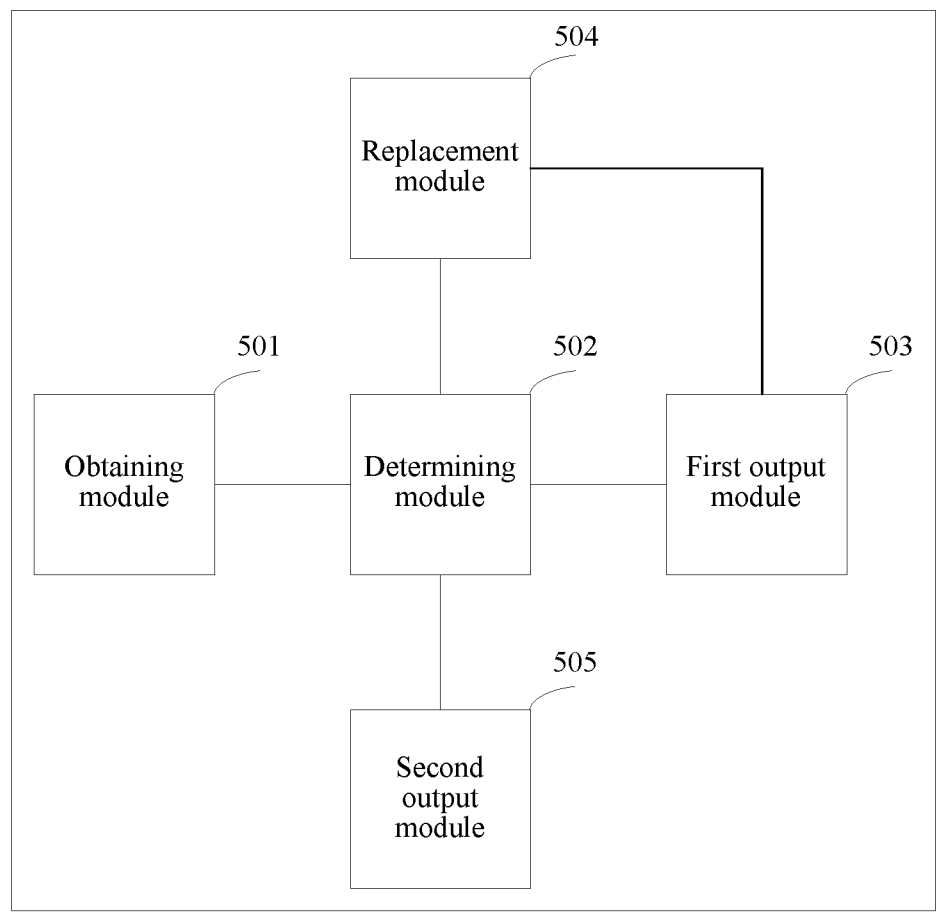
FIG. 11 is a schematic structural diagram of an apparatus for presenting panoramic visual content according to Embodiment 5 of the present invention.

An embodiment of the present invention provides an apparatus for presenting panoramic visual content. Referring to FIG. 11, the apparatus includes:

an obtaining module 501, configured to obtain viewer information of a viewing region of a panoramic visual content presentation device;

a determining module 502, configured to determine a target object according to the viewer information; and a first output module 503, configured to output, according to a change in a position of the target viewer relative to the panoramic visual content presentation device, panoramic visual content in a photographing order of the panoramic visual content or in an order reverse to the photographing order.

In an implementation of this embodiment, the obtaining module 501 may include:

an obtaining unit, configured to obtain an image of the viewing region; and an identification unit, configured to perform human face image identification on the image of the viewing region to obtain the viewer information, where the viewer information includes a human body identified from the image, a position of at least one human body in the image, and an orientation of a human face of at least one human body in the image.

Optionally, the obtaining unit may include:

a detection subunit, configured to detect in real time whether there is a human body in the viewing region; and an obtaining subunit, configured to obtain the image of the viewing region when a human body is detected in the viewing region.

Preferably, the determining module 502 may include:

a viewer determining unit, configured to determine at least one viewer in the viewing region according to the viewer information; and a target viewer determining unit, configured to determine one of the at least one viewer as the target viewer.

Optionally, the target viewer determining unit may be configured to:

determine one of the viewers as the target viewer according to at least one of the following determining manners when there are at least two determined viewers:

determining the target viewer according to whether a human face of the viewer has faced toward the panoramic visual content presentation device;

determining the target viewer according to a viewing angle of the viewer; or determining the target viewer according to a distance between the viewer and the panoramic visual content presentation device.

Preferably, the apparatus may further include:

a replacement module 504, configured to determine, according to at least one of the following conditions, whether to replace the target viewer:

the viewing angle of the target viewer;

the distance between the target viewer and the panoramic visual content presentation device; or whether the target viewer is in the viewing region; and the first output module is configured to output, after the target viewer is replaced and according to a change in a position of a replacement target viewer relative to the panoramic visual content presentation device, panoramic visual content in a photographing order of the panoramic visual content or in an order reverse to the photographing order.

In another implementation of this embodiment, the first output module 503 may include:

an angle determining unit, configured to determine the viewing angle of the target viewer in real time, where the viewing angle of the target viewer is an angle between a connection line and a plane in which the panoramic visual content presentation device is located, and the connection line is between the target viewer and a center of the panoramic visual content presentation device; and a first output unit, configured to output segments whose photographing angles correspond to viewing angles of the target viewer, where the multiple consecutive segments form the panoramic visual content.

Optionally, the segment may be an image or a video presented on the panoramic visual content presentation device.

In still another implementation of this embodiment, the first output module 503 may include:

a distance determining unit, configured to view determine a viewing distance of the target viewer in real time, where the viewing distance of the target viewer is a distance between the target viewer and the panoramic visual content presentation device; and a second output unit, configured to output segments whose photographing distances correspond to viewing distances of the target viewer, where the multiple consecutive segments form the panoramic visual content.

Optionally, the segment may be an image or a video presented on the panoramic visual content presentation device.

In yet another implementation of this embodiment, the apparatus may include:

a second output module 505, configured to output a specified segment or output the panoramic visual content in a specified order when the target viewer cannot be determined.

The panoramic visual content includes multiple consecutive segments.

Optionally, the segment may be an image or a video presented on the panoramic visual content presentation device.

In this embodiment of the present invention, viewer information of a viewing region of a panoramic visual content presentation device is obtained, a target viewer is determined according to the viewer information, and panoramic visual content is output in a photographing order of the panoramic visual content or in an order reverse to the photographing order and according to a change in a position of the target viewer relative to the panoramic visual content presentation device, so that the panoramic visual content is presented, according to the change in the position of the target viewer relative to the panoramic visual content presentation device and according to a requirement of the target viewer on the panoramic content presentation device that cannot be directly touched during viewing, thereby bringing a satisfactory presentation effect and good user experience.

Embodiment 6

Figure 12:
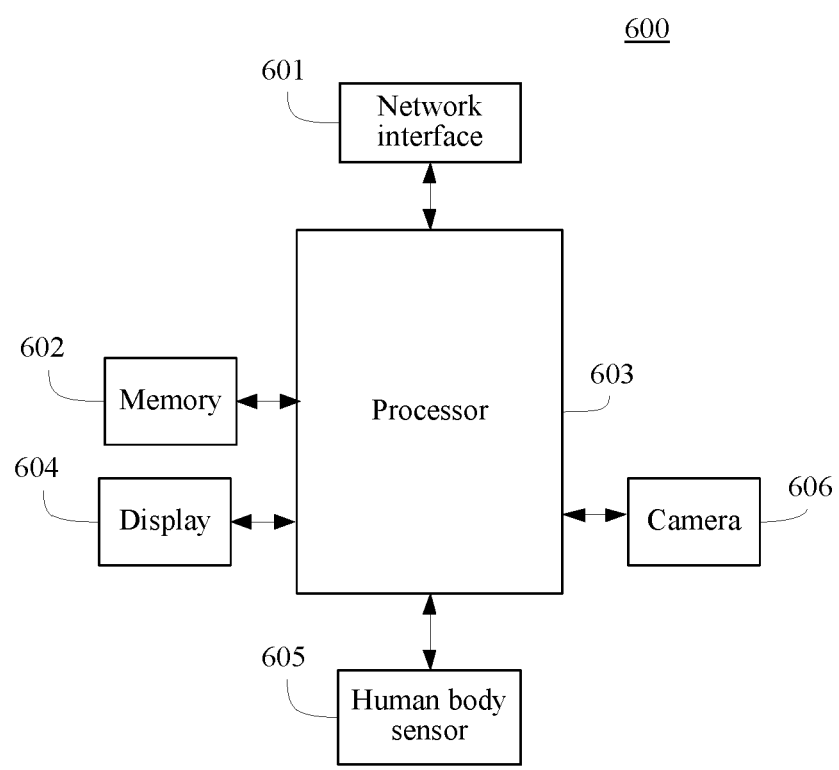
FIG. 12 is a schematic structural diagram of a terminal for presenting panoramic visual content according to Embodiment 6 of the present invention.

An embodiment of the present invention provides a terminal for presenting panoramic visual content. The terminal may be, for example, a server or a personal computer. Referring to FIG. 12, the terminal includes a network interface 601, a memory 602, a processor 603 (for example, a CPU), a display 604, a human body sensor 605, and a camera 606, and may be configured to perform the method in Embodiment 1, Embodiment 2, or Embodiment 3.

The following specifically describes components of the terminal 600 with reference to FIG. 12.

The memory 602 may be configured to store a software program and an application module, and the processor 603 performs various functional applications and data processing of the terminal 600 by operating the software program and the application module stored in the memory 602. The memory 602 may mainly include a program storage area and a data storage area. The program storage area may store an operating system, an application program required by at least one function, and the like. The data storage area may store data (such as panoramic visual content and an image of a viewing region of a panoramic visual content presentation device) created according to processing of the terminal 600, or the like. In addition, the memory 602 may include a high-speed RAM (Random Access Memory, random access memory), or may include a non-volatile memory (non-volatile memory), for example, at least one magnetic disk storage, a flash memory, or another volatile solid-state storage.

The processor 603 is a control center of the terminal 600, and connects to parts of the entire terminal 600 by using various interfaces and lines.

Specifically, by operating or executing the software program and the application module stored in the memory 602 and by calling the data stored in the memory 602 by the processor 603, the processor 603 may obtain viewer information of the viewing region of the panoramic visual content presentation device by using the network interface 601, and determine a target viewer according to the viewer information. The display 604 may output, according to a change in a position of the target viewer relative to the panoramic visual content presentation device, the panoramic visual content in a photographing order of the panoramic visual content or in an order reverse to the photographing order.

In an implementation of this embodiment, the camera 606 may obtain the image of the viewing region. The processor 603 may perform an image analysis on the image of the viewing region to obtain the viewer information. The viewer information includes a human body identified from the image, a position of at least one human body in the image, and an orientation of a human face of at least one human body in the image.

Optionally, the human body sensor 605 may detect in real time whether there is a human body in the viewing region. The camera 606 may obtain the image of the viewing region when a human body is detected in the viewing region.

In another implementation of this embodiment, the processor 603 may determine at least one viewer in the viewing region according to the viewer information, and determine one of the at least one viewer as the target viewer.

Optionally, the processor 603 may determine one of the viewers as the target viewer according to at least one of the following determining manners when there are at least two determined viewers:

determining the target viewer according to whether a human face of the viewer has faced toward the panoramic visual content presentation device;

determining the target viewer according to a viewing angle of the viewer; or determining the target viewer according to a distance between the viewer and the panoramic visual content presentation device.

Optionally, the processor 603 may determine, according to at least one of the following conditions, whether to replace the target viewer:

the viewing angle of the target viewer;

the distance between the target viewer and the panoramic visual content presentation device; or whether the target viewer is in the viewing region; and output, after the target viewer is replaced and according to a change in a position of a replacement target viewer relative to the panoramic visual content presentation device, panoramic visual content in a photographing order of the panoramic visual content or in an order reverse to the photographing order.

In still another implementation of this embodiment, the processor 603 may determine a viewing angle of the target viewer in real time. The viewing angle of the target viewer is an angle between a connection line and a plane in which the panoramic visual content presentation device is located, and the connection line is between the target viewer and a center of the panoramic visual content presentation device. The display 604 may output segments whose photographing angles correspond to viewing angles of the target viewer. The multiple consecutive segments form the panoramic visual content Optionally, the segment may be an image or a video presented on the panoramic visual content presentation device.

In yet another implementation of this embodiment, the processor 603 may determine a viewing distance of the target viewer in real time. The viewing distance of the target viewer is a distance between the target viewer and the panoramic visual content presentation device. The display 604 may output segments whose photographing distances correspond to viewing distances of the target viewer. The multiple consecutive segments form the panoramic visual content.

Optionally, the segment may be an image or a video presented on the panoramic visual content presentation device.

In still yet another implementation of this embodiment, the display 604 may output a specified segment or output the panoramic visual content in a specified order when the target viewer cannot be determined. The panoramic visual content includes multiple consecutive segments.

Optionally, the segment may be an image or a video presented on the panoramic visual content presentation device.

In this embodiment of the present invention, viewer information of a viewing region of a panoramic visual content presentation device is obtained, a target viewer is determined according to the viewer information, and panoramic visual content is output in a photographing order of the panoramic visual content or in an order reverse to the photographing order and according to a change in a position of the target viewer relative to the panoramic visual content presentation device, so that the panoramic visual content is presented, according to the change in the position of the target viewer relative to the panoramic visual content presentation device and according to a requirement of the target viewer on the panoramic content presentation device that cannot be directly touched during viewing, thereby bringing a satisfactory presentation effect and good user experience.

It should be noted that when presenting panoramic visual content, the apparatus for presenting panoramic visual content provided in the foregoing embodiments is merely described by using an example of division of the foregoing functional modules. During actual application, the foregoing functions may be allocated to different functional modules to be completed according to a requirement, that is, an inner structure of the apparatus is divided into different functional modules to complete all or some of the functions described above. In addition, the apparatus for presenting panoramic visual content provided in the foregoing embodiments and the method embodiments for presenting panoramic visual content fall within a same conception. For details of a specific implementation process, refer to the method embodiments. The details are not described again herein.

The sequence numbers of the foregoing embodiments of the present invention are merely for illustrative purposes, and are not intended to indicate priorities of the embodiments.

A person of ordinary skill in the art may understand that all or some of the steps of the embodiments may be implemented by hardware or a program instructing related hardware. The program may be stored in a computer-readable storage medium. The storage medium may include: a read-only memory, a magnetic disk, or an optical disc.

The foregoing descriptions are merely example embodiments of the present invention, but are not intended to limit the present invention. Any modification, equivalent replacement, and improvement made without departing from the spirit and principle of the present invention shall fall within the protection scope of the present invention.

What is claimed is:

1. A method for presenting panoramic visual content, wherein the method comprises:

obtaining viewer information of a viewing region of a panoramic visual content presentation device, wherein the viewer region comprises multiple viewers;

determining a target viewer from the multiple viewers according to the viewer information; and outputting, according to a change in a position of the target viewer relative to the panoramic visual content presentation device, panoramic visual content in a time order by which the panoramic visual content is captured or in a reverse time order by which the panoramic visual content is captured, determining, according to at least one of the following conditions, whether to replace the target viewer from the multiple viewers;

the viewing angle of the target viewer;

the distance between the target viewer and the panoramic visual content presentation device; or whether the target viewer is in the viewing region; and after the target viewer is replaced, outputting, according to a change in a position of a replacement target viewer relative to the panoramic visual content presentation device, the panoramic visual content in the photographing order or in the order reverse to the photographing order.

2. The method according to claim 1, wherein obtaining the viewer information of the viewing region of a panoramic visual content presentation device comprises:

obtaining an image of the viewing region; and performing an image analysis on the image of the viewing region to obtain the viewer information, wherein the viewer information comprises at least one human body identified from the image, a position of the at least one human body in the image, and an orientation of a human face of the at least one human body in the image.

3. The method according to claim 2, wherein obtaining the image of the viewing region comprises:

detecting in real time whether there is a human body in the viewing region; and obtaining the image of the viewing region when a human body is detected in the viewing region.

4. The method according to claim 1, wherein determining the target viewer from the multiple viewers according to the viewer information comprises:

determining the target viewer according to whether a human face of the viewer has faced toward the panoramic visual content presentation device;

determining the target viewer according to a viewing angle of the target viewer; or determining the target viewer according to a distance between the target viewer and the panoramic visual content presentation device.

5. The method according to claim 1, wherein outputting, according to a change in a position of the target viewer relative to the panoramic visual content presentation device, the panoramic visual content in the time order or in the reverse time order comprises:

determining the viewing angle of the target viewer in real time; and outputting multiple segments having photographing angles corresponding to viewing angles of the target viewer, wherein the multiple segments form the panoramic visual content.

6. The method according to claim 1, wherein outputting, according to the change in a position of the target viewer relative to the panoramic visual content presentation device, the panoramic visual content in the time order or in the reverse time order comprises:

determining a viewing distance of the target viewer in real time; and outputting multiple segments having photographing distances corresponding to viewing distances of the target viewer, wherein the multiple segments form the panoramic visual content.

7. The method according to claim 1, wherein the method further comprises:

outputting a specified segment when the target viewer cannot be determined, wherein the panorama visual content comprises multiple segments.

8. A terminal for presenting panoramic visual content, wherein the terminal comprises:

a processor, configured to obtain viewer information of a viewing region of the terminal, wherein the viewer region comprises multiple viewers; and determine from the multiple viewers a target viewer according to the viewer information; and a display, configured to output, according to a change in a position of the target viewer relative to the panoramic visual content presentation device, panoramic visual content in a time order by which the panoramic visual content is captured or in a reverse time order by which the panoramic visual content is captured;

wherein the processor is further configured to:

determine, according to at least one of the following conditions, whether to replace the target viewer;

the viewing angle of the target viewer;

the distance between the target viewer and the panoramic visual content presentation device; or whether the target viewer is in the viewing region; and after the target viewer is replaced, output, according to a change in a position of a replacement target viewer relative to the panoramic visual content presentation device, the panoramic visual content in the photographing order or in the order reverse to the photographing order.

9. The terminal according to claim 8, wherein the terminal further comprises:

a camera, configured to obtain an image of the viewing region; and the processor is configured to perform an image analysis on the image of the viewing region to obtain the viewer information, wherein the viewer information comprises at least one human body identified from the image, a position of at least one human body in the image, and an orientation of a human face of the at least one human body in the image.

10. The terminal according to claim 9, wherein the terminal further comprises:

a human body sensor, configured to detect in real time whether there is a human body in the viewing region; and the camera is configured to obtain the image of the viewing region when a human body is detected in the viewing region.

11. The terminal according to claim 8, wherein the processor is configured to:

determine one of the multiple viewers as the target viewer according to at least one of the following determining manners:

determining the target viewer according to whether a human face of the viewer has faced toward the panoramic visual content presentation device;

determining the target viewer according to a viewing angle of the viewer; or determining the target viewer according to a distance between the viewer and the panoramic visual content presentation device.

12. The terminal according to claim 8, wherein the processor is configured to determine the viewing angle of the target viewer in real time; and the display is configured to output multiple segments whose photographing angles correspond to viewing angles of the target viewer, wherein the multiple segments form the panoramic visual content.

13. The terminal according to claim 8, wherein the processor is configured to determine a viewing distance of the target viewer in real time; and the display is configured to output multiple segments whose photographing distances correspond to viewing distances of the target viewer, wherein the multiple segments form the panoramic visual content.

14. The terminal according to claim 8, wherein the display is further configured to:

output a specified segment when the target viewer cannot be determined, wherein the panorama visual content comprises multiple segments.

\* \* \* \* \*